United States Patent [19]
Huber et al.

[11] Patent Number: 6,147,882
[45] Date of Patent: Nov. 14, 2000

[54] SINGLE-STAGE INPUT CURRENT SHAPING TECHNIQUE WITH VOLTAGE-DOUBLER RECTIFIER FRONT-END

[75] Inventors: Laszlo Huber, Apex, N.C.; Jindong Zhang, Blacksburg, Va.; Milan M. Jovanovic, Cary, N.C.; Fred C. Lee, Blacksburg, Va.

[73] Assignees: Delta Electronics, Inc., Taipei, Taiwan; Virginia Tech. Intellectual Properties, Inc., Blacksburg, Va.

[21] Appl. No.: 09/215,758

[22] Filed: Dec. 19, 1998

[51] Int. Cl.[7] .................................................. H02M 1/12
[52] U.S. Cl. ................................ 363/39; 363/17; 363/20; 363/61; 363/143
[58] Field of Search ........................... 363/15–17, 20–21, 363/24–26, 34, 37, 39–40, 59–61, 142–143

[56] References Cited

U.S. PATENT DOCUMENTS

| | | | |
|---|---|---|---|
| 5,301,095 | 4/1994 | Teramoto et al. | 363/21 |
| 5,600,546 | 2/1997 | Ho et al. | 363/21 |
| 5,652,700 | 7/1997 | Tsai et al. | 363/21 |
| 5,757,626 | 5/1998 | Jovanovic et al. | 363/21 |
| 5,790,389 | 9/1998 | Hua | 363/20 |
| 5,909,107 | 6/1999 | Aonuma et al. | 363/39 |

OTHER PUBLICATIONS

"The suppressing harmonic currents, MS (Magnetic–Switch) power supply", Watanabe et al., IEEE, Dec. 1995, pp. 783–790.

"Integrated High Quality Rectifier–Regulators", Madigan, et al., IEEE, Mar., Mar. 1992, pp. 1043–1051.

"A Switching Power Supply of 99% Power Factor By the Dither Rectifier", Takahasi, et al., IEEE, Nov., 1991, pp. 714–719.

"A High Efficient Single Stage Switch High Power Factor AC/DC Converter With Universal Input", Qian, et al., IEEE, Feb. 1997, pp. 281–287.

*Primary Examiner*—Jeffrey Sterrett
*Attorney, Agent, or Firm*—Skjerven Morrill MacPherson LLP; Edward C. Kwok

[57] ABSTRACT

A single-stage input-current-shaping ($S^2ICS$) converter of the present invention integrates a voltage-doubler-rectifier front-end with a DC/DC output stage. Two families of voltage-doubler $S^2ICS$ converters are disclosed. In one family, a 2-terminal dither source is provided between a boost inductor and a common input terminal of a storage capacitor and the DC/DC output stage. The 2-terminal dither source includes two paths connected in parallel: a first path for charging and a second path for discharging the boost inductor at a high frequency (HF). In the other family, a 3-terminal dither source includes a third terminal coupled to a pulsating node of the DC/DC output stage. In the 3-terminal dither source, the HF charging path of the boost inductor is coupled between the boost inductor and the pulsating node of the DC/DC output stage, while the HF discharging path of the boost inductor is coupled between the boost inductor and the common input terminal of the storage capacitor and the DC/DC output stage. Due to the voltage-doubler-rectifier front-end, reduction of line-current harmonics can be achieved with a higher conversion efficiency, as compared to a corresponding $S^2ICS$ converter with a conventional full-bridge rectifier. In addition, a converter of the present invention requires storage capacitors of a lower voltage rating and a smaller total capacitance than the conventional $S^2ICS$ counterpart. The present invention thereby reduces the size and the cost of the power supply.

16 Claims, 23 Drawing Sheets

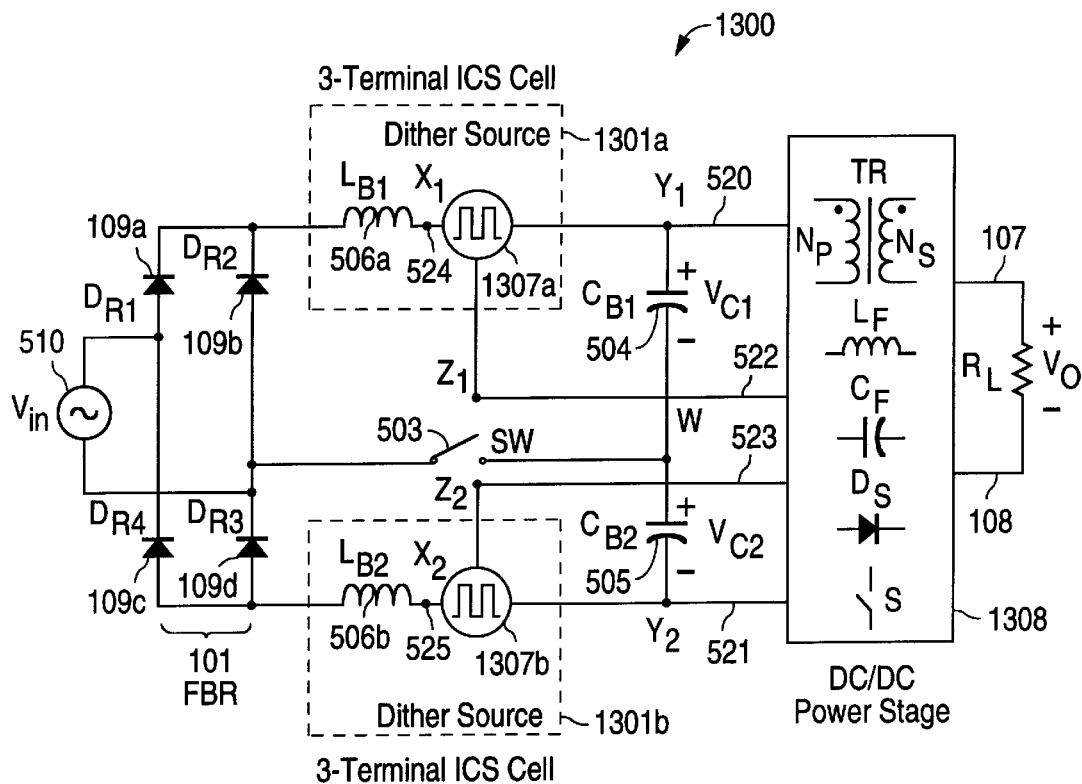
FIG. 13
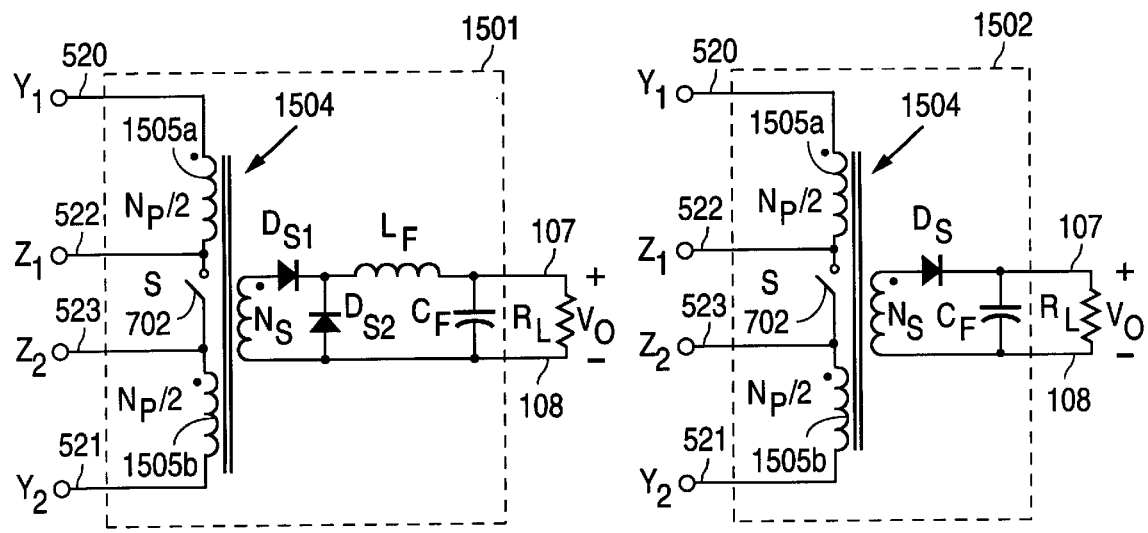
FIG. 15a  FIG. 15b

SINGLE-STAGE INPUT CURRENT SHAPING TECHNIQUE WITH VOLTAGE-DOUBLER RECTIFIER FRONT-END

BACKGROUND OF THE INVENTION

1. Field of the Invention

The present invention relates to circuits for power conversion applications. In particular, the present invention relates to a single-stage input-current-shaping converter for universal line-range applications.

2. Description of the Related Art

The harmonic content of a current drawn by an electronic equipment from the AC mains is regulated by a number of standards. To comply with these standards, input-current shaping (ICS) of off-line power supplies is necessary. At present, various passive and active ICS techniques are used. While the passive techniques are preferred in many cost-sensitive applications, active ICS techniques are used in most applications because of their superior performance.

The most commonly used active approach that meets both high power and high quality requirements is the "two-stage" approach. In this approach, a non-isolated boost-like converter, which is controlled so that the rectified line current follows the rectified line voltage, is used as the input stage that creates an intermediate DC bus with a relatively large ripple at the second-harmonic frequency of the line. This ICS stage is then followed by a DC/DC converter which provides isolation and high-bandwidth voltage regulation. The DC/DC converter attenuates the second-harmonic ripple to an acceptable level. At a high-power level, the ICS stage is operated in the continuous-conduction mode (CCM), while at a lower power level, a discontinuous-conduction mode (DCM) is commonly used. Compared to CCM, DCM is simpler to control.

To reduce component count and to improve performance, a number of "single-stage" ICS techniques are introduced recently. Under a single-stage approach, input-current shaping, isolation, and high-bandwidth control are performed in a single step (i.e., without creating an intermediate DC bus). Generally, a single-stage ICS converter uses an internal storage capacitor to buffer between an instantaneously varying input power and a constant output power.

Among single-stage input-current-shaping ($S^2$ICS) circuits are a number of circuits described in the following publications: (a) "A Switching Power Supply of 99% Power Factor by the Dither Rectifier," by I. Takahasi et al., *IEEE International Telecommunications Energy Conf.* (*INTELEC*) *Proc.*, pp. 714–719, November 1991; (b) "Integrated High-Quality Rectifier-Regulators," by M. Madigan et al., *IEEE Power Electronics Specialists Conf.* (*PESC*) *Record*, pp. 1043–1051, June 1992; (c) U.S. Pat. No. 5,301,095, entitled "High Power Factor AC/DC Converter," to S. Teramoto et al., filed on Sep. 28, 1992, and issued on Apr. 5, 1994; (d) "The Suppressing Harmonic Currents, MS (Magnetic Switch) Power Supply," by H. Watanabe et al., *IEEE International Telecommunication Energy Conf.* (*INTELEC*) *Proc.*, pp. 783–790, October 1995; (e) U.S. Pat. No. 5,600,546, entitled "Input Harmonic Current Corrected AC-to-DC Converter with Multiple Coupled Primary Windings," to F. M. S. Ho et al., filed on Oct. 16, 1996, and issued on Feb. 4, 1997; (f) U.S. Pat. No. 5,652,700, entitled "Low Cost AC-to-DC Converter Having Input Current with Reduced Harmonics," to F. S. Tsai et al, filed on Jan. 19, 1996, and issued on Jul. 29, 1997; (g) "A High Efficient Single Stage Single Switch High Power Factor AC/DC Converter with Universal Input," by J. Qian et al., *IEEE Applied Power Electronics Conference* (*APEC*) *Proc.*, pp. 281–287, February 1997; (h) U.S. Pat. No. 5,757,626, entitled "Single-Stage, Single-Switch Isolated Power-Supply Technique with Input-Current Shaping and Fast Output-Voltage Regulation," to M. M. Jovanovic at al, filed on Oct. 4, 1996, and issued on May 26, 1998; and (i) U.S. Pat. No. 5,790,389, entitled "Consolidated Soft-Switching AC/DC Converters," to G. Hua, filed on May 31, 1996, and issued on Aug. 4, 1998.

For many applications, single-switch $S^2$ICS converters are particularly attractive because they can be implemented with only one semiconductor switch and a simple control. In the single-switch $S^2$ICS circuits described in the references above, the single-switch $S^2$ICS converters integrate a boost-converter front-end with a forward-converter or a flyback-converter DC/DC stage. For example, FIGS. 1–3 show single-switch $S^2$ICS converters described in the above-referenced publications of Teramoto et al, Watanabe at al., and Tsai et al., respectively.

As shown in FIGS. 1–3, the front-ends of converters 100, 200, and 300 each include a full-bridge rectifier 101 connected to a boost converter including boost inductor 102, boost rectifier 103, and storage (bulk) capacitor 104. The output portions of converters 100, 200, and 300 are conventional DC/DC, single-switch forward or flyback converters. In converter 100 of FIG. 1, boost inductor 102 is energized through capacitor 110 when switch 105 is closed. In converters 200 and 300 of FIGS. 2 and 3, boost inductors 102 are energized through windings 111 of transformers 206 and 306, respectively.

In converter 100 of FIG. 1, boost inductor 102 operates in CCM, while in each of converters 200 and 300 of FIGS. 2 and 3, boost inductor 102 operates in DCM. The CCM operation offers a slightly higher efficiency over the DCM operation. However, the DCM operation provides a lower total harmonic distortion (THD) of the line current over the CCM operation.

As mentioned above, in an ICS application, the rectified line voltage contains a large ripple. This ripple propagates through the power stage, causing an increased output-voltage ripple at the rectified-line frequency (i.e., the second-harmonic frequency of the line). To eliminate the rectified-line-voltage component of the output-voltage ripple, the output-voltage feedback loop is designed with a bandwidth which is wide enough to attenuate the ripple to a desired value. The desired bandwidth, regulation accuracy, and control-loop stability are set by a proper selection of the voltage-loop compensation.

Although it has been demonstrated that the $S^2$ICS converters described in the above-referenced publications can achieve the desired performance in a variety of applications, power supplies based on these approaches have significant difficulties meeting performance expectations in universal-line (e.g., 90–270 V AC) applications with a hold-up time requirement. For example, most of today's desktop computers and computer peripherals require power supplies that are capable of operating in the 90–270 V AC range and can provide a hold-up time of at least 10 ms. Generally, the hold-up time is the time during which a power supply must maintain its output voltage within a specified range after a drop-out of the line voltage. The hold-up time is used to orderly terminate the operation of a computer or to switch over to an uninterruptible-power-supply (UPS) operation after a line failure. The required energy to support the output voltage during the hold-up time is obtained from a properly-sized storage capacitor, such as capacitor 104. Since the energy stored in a capacitor is proportional to its capacitance and the square of the voltage across its terminals, the required capacitance increases with an increase of the hold-up time. Also, the same hold up time can be achieved by a smaller capacitance, if the voltage across the storage capacitor's terminals is higher.

Since voltage $V_C$ across storage capacitor 104 varies with both the line voltage and the load current, converters 100, 200, and 300 in FIGS. 1–3 have difficulty in satisfying the wide line range and long hold-up time requirements. Specifically, in converters 100, 200, and 300, only output voltage $V_o$ across terminals 107 and 108 is regulated. Voltage $V_C$ across storage capacitor 104 follows the root-mean-square (rms) variations of the line voltage. Therefore, since the universal-line range is 3:1 (90–270 V AC), voltage $V_C$ also varies over a range 3:1. In addition, because storage capacitor 104 is the output filter of the boost converter, voltage $V_C$ must be higher than the peak of the line voltage. As a result, for a line voltage of 270 V AC, voltage $V_C$ is at least in the 380–390 V DC range. Moreover, storage capacitor voltage $V_C$ increases as the load current decreases. In most applications, voltage $V_C$ can be kept in the 410–420 V DC range. Thus, capacitor 104 can be implemented by a 450 V electrolytic capacitor. Since the capacitance of capacitor 104 is determined from the hold-up time requirement at the minimum line voltage (worst case), converters 100, 200, and 300 of FIGS. 1–3 each require a relatively bulky and expensive storage capacitor. Further, because voltage $V_C$, which represents an input voltage to the DC/DC output stage, varies over a wide range, conversion efficiency of the output stage is reduced. In contrast, under the two-stage approach, in which the storage capacitor voltage is independently regulated at approximately 380 V DC, a much smaller and, therefore, cheaper electrolytic capacitor rated at 450 V, or even 400 V, is adequate. In addition, in a two-stage approach, due to the regulated storage capacitor voltage $V_C$, the efficiency of the DC/DC output stage can be made higher than the efficiency of the single-stage approach in the converters of FIGS. 1–3. Relative to the two-stage approach, because of the size and the cost of the power supply necessary, the relatively large capacitor (i.e., storage capacitor 104) required for a S²ICS converter is a significant drawback.

The performance of a conventional, universal-line-range power supply without ICS can be improved by a voltage-doubler rectifier, such as converter 400 shown in FIG. 4. In FIG. 4, converter 400 includes a voltage-doubler rectifier, which operates as a conventional full-bridge rectifier when range-select switch 401 is open, and as a voltage doubler when range-select switch 401 is closed. Generally, range-select switch 401 can be a mechanical or an electronic switch. When converter 400 is connected to a power line with a nominal line voltage of 220/240 V AC (European line), switch 401 is open. Conversely, when converter 400 operates from a power line with the nominal voltage of 100/120 V AC, switch 401 is closed. With range-select switch 401 in FIG. 4 open (i.e., operating from a 220/240 V AC power line), the front-end portion of converter 400 works as a conventional rectifier, and thus the output voltage $V_C$ across the series-connected capacitors 402 and 403 is approximately equal to the peak of the line voltage.

In the voltage-doubler mode (i.e., when switch 401 is closed and converter 400 operates from the 100/120 V AC power line), capacitor 402 is charged to the peak of the line voltage through rectifier 109a during a positive half-cycle of the line voltage, and capacitor 403 is charged to the peak of the line voltage through rectifier 109c during a negative half-cycle of the line voltage. In the voltage-doubler mode, rectifiers 109b and 109d do not conduct, being reverse-biased by voltages $V_{C1}$ and $V_{C2}$ of capacitors 402 and 403, respectively. Because output voltage $V_C$ of the front-end portion of converter 400 is the sum of capacitor voltages $V_{C1}$ and $V_{C2}$, (i.e., $V_C=V_{C1}+V_{C2}$), output voltage $V_C$ in the voltage-doubler mode is twice the peak of the line voltage. Therefore, due to voltage-doubling, output voltage $V_C$ of the front-end portion of converter 400 is approximately the same for both 100/120 V AC and 220/240 V AC power lines. Specifically, for the universal-line range 90–270 V AC, output voltage $V_C$ f the front-end of converter 400 varies from approximately 180 V AC to 270 V AC. Since this resulting voltage range is much narrower than the corresponding voltage range of the conventional wide-range full-bridge rectifier, the conversion efficiency of the DC/DC output portion of converter 400 is improved. In addition, because voltage $V_C$ of converter 400 is at least twice as high as that of the wide-range full-bridge rectifier, the total capacitance (i.e., the sum of the capacitances of capacitors 402 and 403) required for a given hold-up time of converter 400 is approximately one-half of that required in the wide-range full-bridge rectifier. Finally, since each capacitor sees a lower voltage across its terminals, storage capacitors 402 and 403 need only be rated at 250 V DC, or even 200 V DC. Capacitors with a lower voltage rating are usually significantly less expensive than their higher voltage rated counterparts.

Therefore, in a universal-line application with a old-up time requirement, a front-end with voltage-doubler rectifier offers a number of advantages over a conventional, wide-range, full-wave rectifier such as higher conversion efficiency, smaller size, and lower cost.

SUMMARY OF THE INVENTION

In accordance with the present invention, a single-stage input current shaping (S²ICS) converter coupled to receive a line voltage is provided. A converter of the present invention includes (a) a front-end stage receiving the line voltage, which includes a full-bridge rectifier, a boost inductor, and a dither source, (b) a storage capacitor coupled to be charged by the boost inductor for storing energy for output; and (c) a DC/DC power converter stage for transferring the energy stored in the storage capacitor to an output load. The boost inductor can be coupled on the AC side, between the line voltage and the full-bridge rectifier, or on the DC side between the full-bridge rectifier and the dither source. The dither source includes two paths: a first path for charging and a second path for discharging the boost inductor at a high frequency. Each of the two paths includes a series connection of a transformer winding and at least one of the following components: a diode, an inductor, and a capacitor. The DC/DC power converter stage includes a transformer inductively coupled to the transformer windings of the two paths of the dither source. The DC/DC converter stage is controlled by a switch which, when closed, enables a current to be drawn by the DC/DC converter stage from the storage capacitor. As the DC/DC converter draws current from the storage capacitor, the boost inductor stores energy in its magnetic field. When the switch is open, the energy in the boost inductor discharges into the storage capacitor.

In one embodiment, the two paths of the dither source are connected in parallel, thereby the dither source having two terminals: a first terminal being coupled to the boost inductor and a second terminal being coupled to both the storage capacitor and the DC/DC converter stage. The transformer winding of the first path of the dither source (for charging the boost inductor) is coupled to generate a voltage in opposition to the storage-capacitor voltage when the switch of the DC/DC converter is closed, and the transformer winding of the second path of the dither source (for discharging the boost inductor) is coupled to generate a voltage of the same direction as the storage-capacitor voltage when the switch of the DC/DC converter is open, thereby reducing the voltage of the storage capacitor.

In another embodiment, the two paths of the dither source are coupled at only one terminal, which is coupled to the boost inductor, thereby the dither source having three terminals: a first terminal being coupled to the boost inductor, a second terminal, which is the second terminal of the second path of the dither source (for discharging the boost inductor), being coupled to both the storage capacitor and the DC/DC converter stage, and a third terminal, which is the second terminal of the first path of the dither source (for charging the boost inductor), being coupled to any pulsating node (e.g., to the switch) of the DC/DC converter stage. The transformer winding of the fist path of the dither source is coupled to generate a voltage in opposition to the rectified line voltage when the switch of the DC/DC converter is closed, and the transformer winding of the second path of the dither source is coupled to generate a voltage in opposition to the rectified line voltage when the switch of the DC/DC converter is open, thereby reducing the voltage of the storage capacitor. The transformer windings of the two paths of the 3-terminal dither source can be also implemented by tapping the primary winding of the transformer of the DC/DC converter stage, i.e., the transformer windings of the two paths of the 3-terminal dither source can be implemented as portions of the primary winding of the transformer of the DC/DC converter stage.

The $S^2ICS$ converter of the present invention further includes a second boost inductor, a second dither source, and a second storage capacitor, as well as a range-select switch, which is coupled between the full bridge rectifier and the storage capacitors. The range-select switch can be controlled according to the voltage range of the line voltage. Specifically, in a universal-line application, when operating at a low line range (i.e., from a 100/120 V AC power line), the range-select switch is closed and the front-end portion of the $S^2ICS$ converter operates in a voltage-doubler mode, wherein the first boost inductor, the first dither source, and the first storage capacitor are active during a positive half-cycle of the line voltage, and the second boost inductor, the second dither source, and the second storage capacitor are active during a negative half-cycle of said line voltage. When operating at a high line range (i.e., from a 220/240 V AC power line), the range-select switch is open and the full-bridge rectifier operates in the full-bridge rectifier mode, wherein each pair of the two boost inductors, the two dither sources, and the two storage capacitors is connected in series.

The two boost inductors on the DC side of the front-end stage can be also implemented as coupled inductors. Furthermore, an inductor of the first dither source can be inductively coupled to the corresponding inductor of the second dither source.

The DC/DC converter stage can be implemented by a pulse-width-modulated forward converter, flyback converter, half-bridge converter, and full-bridge converter. However, any other isolated DC/DC converter configuration, e.g., various soft-switching converter configurations, can be also used in conjunction with the present invention. In configurations involving 3-terminal dither sources, however, only single-ended DC/DC converter stages such as a single-ended forward converter or a single-ended flyback converter can be used.

Due to the voltage-doubler-rectifier front-end, reduction of line-current harmonics can be achieved with a higher conversion efficiency, as compared to a corresponding $S^2ICS$ converter with a conventional full-bridge rectifier. In addition, a converter of the present invention requires storage capacitors of a lower voltage rating and a smaller total capacitance than the conventional $S^2ICS$ counterpart. The present invention thereby reduces the size and the cost of the power supply.

The present invention is better understood upon consideration of the detailed description below and the accompanying drawings.

BRIEF DESCRIPTION OF THE DRAWINGS

FIG. 13 is a generalized circuit diagram of $S^2ICS$ converter 1300 of the present invention, having a voltage-doubler front-end which employs 3-terminal ICS cells 1301a and 1301b.

FIGS. 15(a) and 15(b) show examples of DC/DC power converter stages that can implement DC/DC power converter stage 1308 of FIG. 13.

DETAILED DESCRIPTION OF THE PREFERRED EMBODIMENTS

Figure 1:
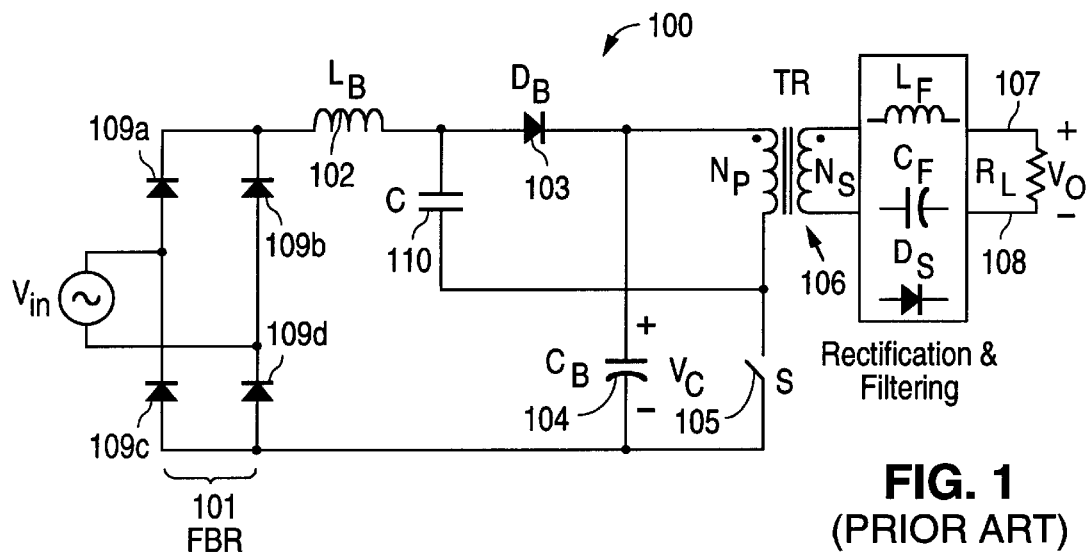
FIG. 1 shows single-switch single-stage input current shaping ($S^2ICS$) converter 100 of the prior art.
Figure 2:
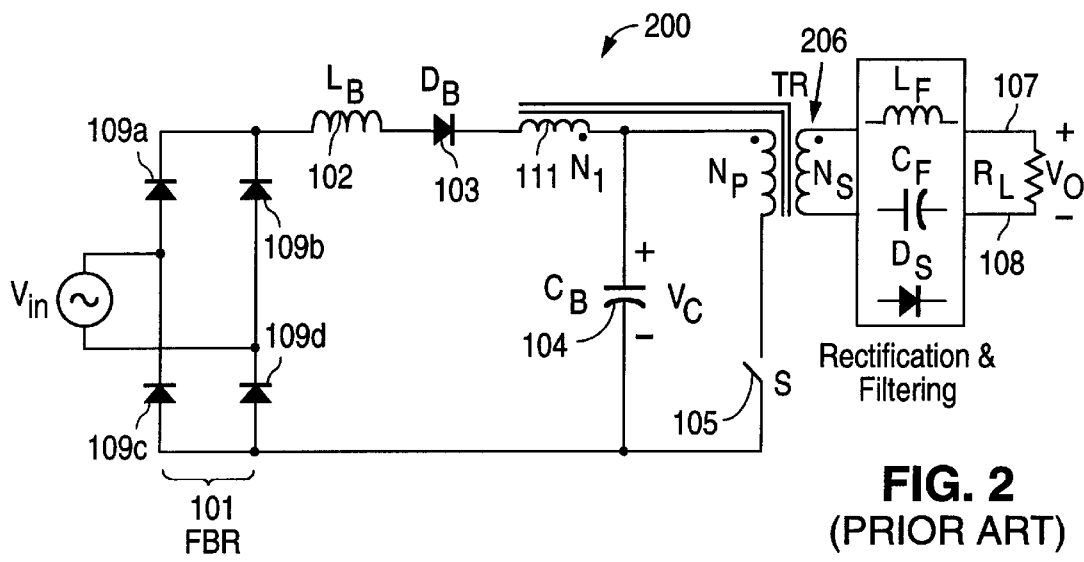
FIG. 2 shows $S^2ICS$ converter 200 of the prior art.
Figure 3:
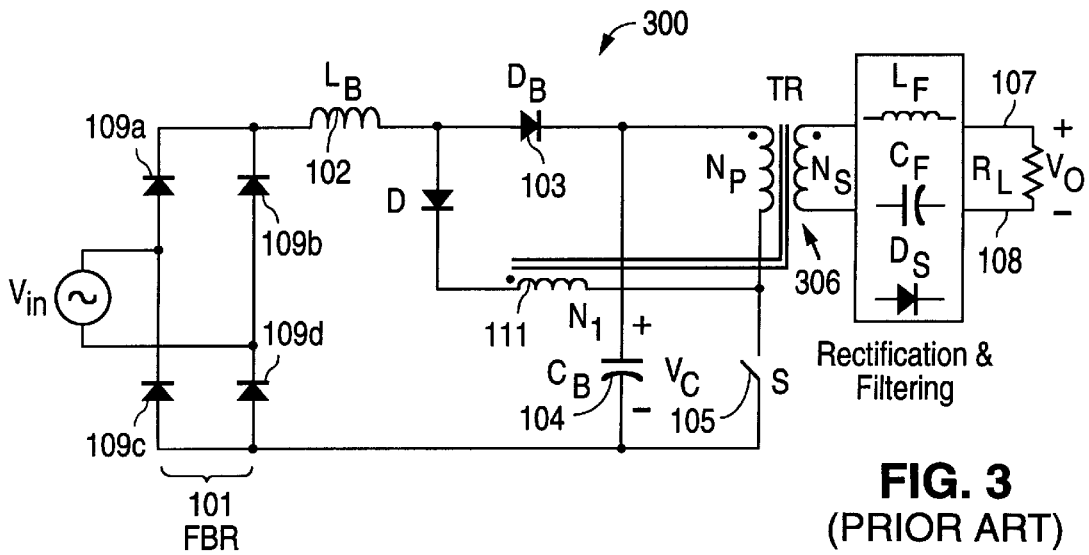
FIG. 3 shows $S^2ICS$ converter 300 of the prior art.
Figure 4:
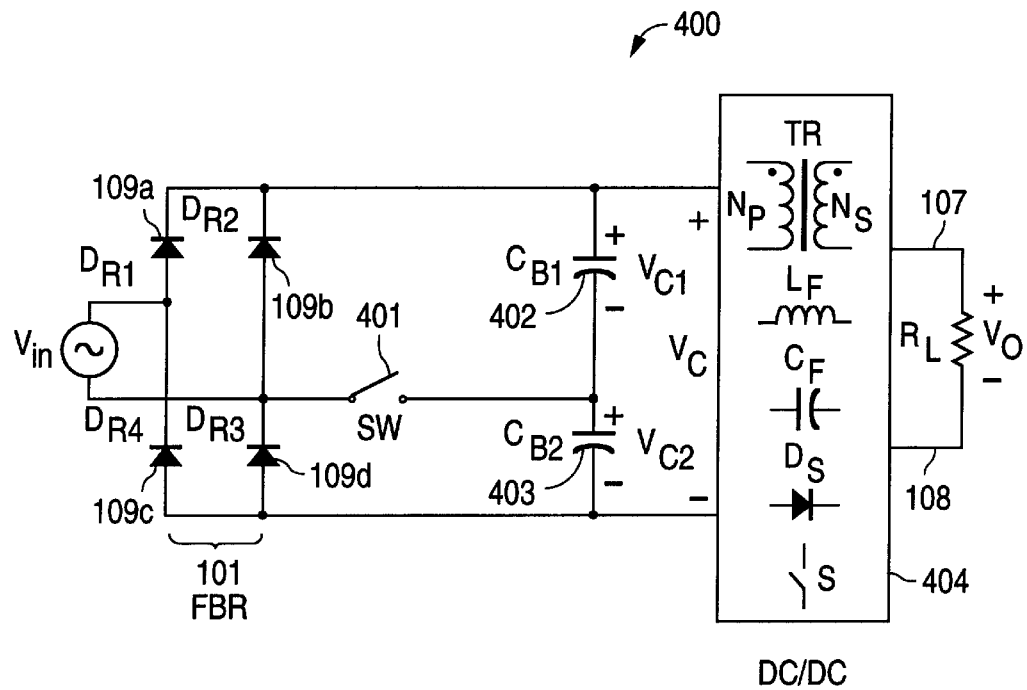
FIG. 4 shows a conventional universal-line-range converter 400 without input current shaping, but including a voltage-doubler-rectifier front-end of the prior art.
Figure 5:
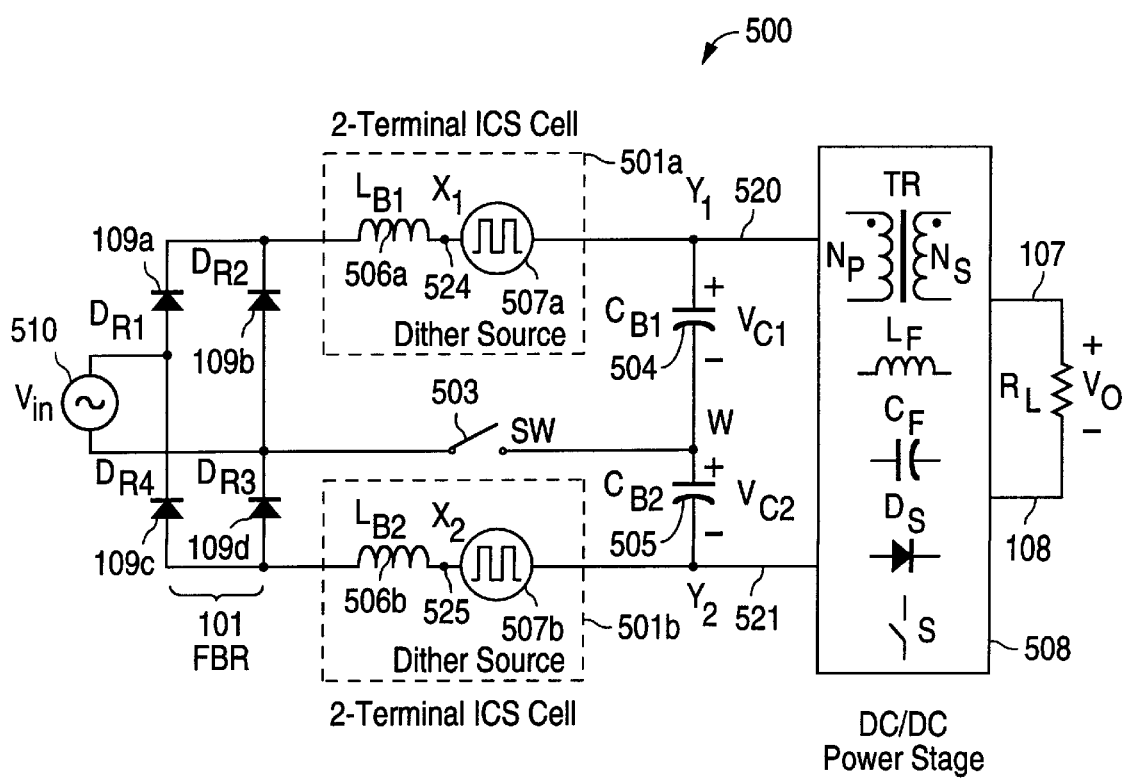
FIG. 5 shows the generalized circuit diagram of $S^2ICS$ converter 500 of the present invention, having a voltage-doubler front-end which employs 2-terminal ICS cells 501a and 501b.

An S²ICS converter with a voltage-doubler front-end of the present invention can be implemented in a number of ways. To simplify this detailed description and to facilitate correspondence among the various figures, like elements in this detailed description are assigned like reference numerals. FIG. 5 shows a generalized circuit diagram of S²ICS converter 500 with a voltage-doubler front-end having 2-terminal input-current shaping (ICS) cells 501a and 501b. As shown in FIG. 5, two identical 2-terminal ICS cells 501a and 501b are inserted between full-bridge rectifier 101 and series-connected storage capacitors 504 and 505, in both the positive and the negative rails. Generally, each of 2-terminal ICS cells 501a and 501b includes a boost inductor (e.g., boost inductor 506a) and a high-frequency dither source (e.g., dither source 507a) connected in series. The dither source (e.g., dither source 507a) charges and discharges the associated boost inductor (e.g., boost inductor 506a) at a high frequency, so that the average inductor current (which equals the line current) follows the line voltage. The DC/DC power converter stage 508 in FIG. 5 can be implemented by any known isolated power-conversion topology.

Generally, a high-frequency dither source is generated by utilizing a switching waveform in the DC/DC power converter stage. FIGS. 6(a)–6(g) show various dither sources 601–607. Specifically, FIGS. 6(a)–6(g) show (a) DCM source 601, (b) CCM current source 602, (c) CCM current source 603, (d) CCM voltage source 604, (e) CCM voltage/current source 605, (f) CCM voltage/current source 606, and (g) CCM resonant source 607. Each of implementations 601–607 uses a combination of diodes such as diode 610 (FIGS. 6(a), 6(b), 6(c), 6(f), and 6(g)) and passive components such as inductor 612 (FIGS. 6(b), 6(c), 6(e), 6(f), and 6(g)), capacitor 613 (FIGS. 6(d), 6(e), 6(f), and 6(g)), and windings 614 and 615 (FIGS. 6(a)–6(g)) of the transformer in DC/DC power converter stage 508 of FIG. 5. In each of dither sources 601–607 of FIGS. 6(a)–6(g), a high-frequency signal is obtained by windings 614 and 615. In conjunction with all dither sources in FIG. 6, except DCM source 601 of FIG. 6(a), boost inductors 506a and 506b operate in CCM. In each of dither sources 601–607, the charging and discharging paths of boost inductors 506a and 506b are different. If the number of turns $N_2$ of winding 615 is less than number of turns $N_1$ of winding 614 (i.e., $N_2 < N_1$), boost inductors 506a and 506b charge through windings 614 and discharge through windings 615. When boost inductors 506a and 506b charge, the voltage across windings 614 opposes the voltage across capacitors 504 and 505, and the voltages across boost inductors 506a and 506b are each positive. For proper operation, number of turns $N_1$ of winding 614 should be selected to be $0 < N_1 \leq N_p/2$, where $N_p$ is the number of turns of the primary winding of the transformer in DC/DC isolated power converter stage 508. When boost inductors 506a and 506b discharge, the voltage across windings 615 is in the same direction as the voltage across storage capacitors 504 and 505. Therefore, windings 615 effectively increase the reset voltage across boost inductors 506a and 506b. However, converter 500 of FIG. 5 properly operates even when the number of turns $N_2$ of windings 615 is zero.

FIGS. 7(a)–7(d) show DC/DC power converter stages 701–704 which can each be used to implement power converter stage 508 of FIG. 5. Specifically, FIGS. 7(a)–7(d) show, respectively, a pulse-width-modulated (PWM) forward converter 701, flyback converter 702, half-bridge converter 703, and full-bridge converter 704. However, any of other isolated DC/DC converter configurations, e.g., various soft-switching isolated converters, can also be used in conjunction with the present invention. DC/DC converter stages 701–704 of FIG. 7 can be controlled using any PWM control technique. Generally, the duty cycle of DC/DC converter stage 508 of FIG. 5 is controlled by sensing the output voltage to achieve a tight output voltage regulation and a fast transient response, while input current shaping is achieved by ICS cells 501a and 501b. Since DC/DC converter stages 701–704 of FIG. 7 are known in the art, further description of these circuits is omitted.

FIGS. 8(a)–8(d) and 9(a)–9(d) show, respectively, the operation modes of S²ICS converter 500 of FIG. 5 at a low line-range (i.e., when connected to a 100/120 V AC power line) and at a high line-range (e.g., connected to a 220/240 V AC power line). In the low line-range (i.e., FIGS. 8(a)–8(d)), range-select switch 503 is closed and the front end of converter 500 operates in the voltage-doubler mode, in which diode 109a, boost inductor 506a, and dither source 507a are active during a positive half cycle of the line voltage (i.e., voltage $v_{in} > 0$; $v_{in}$ being the input line voltage), and diode 109c, boost inductor 506b, and dither source 507b are active during a negative half cycle of the line voltage (i.e., voltage $v_{in} < 0$).

Figure 8A:
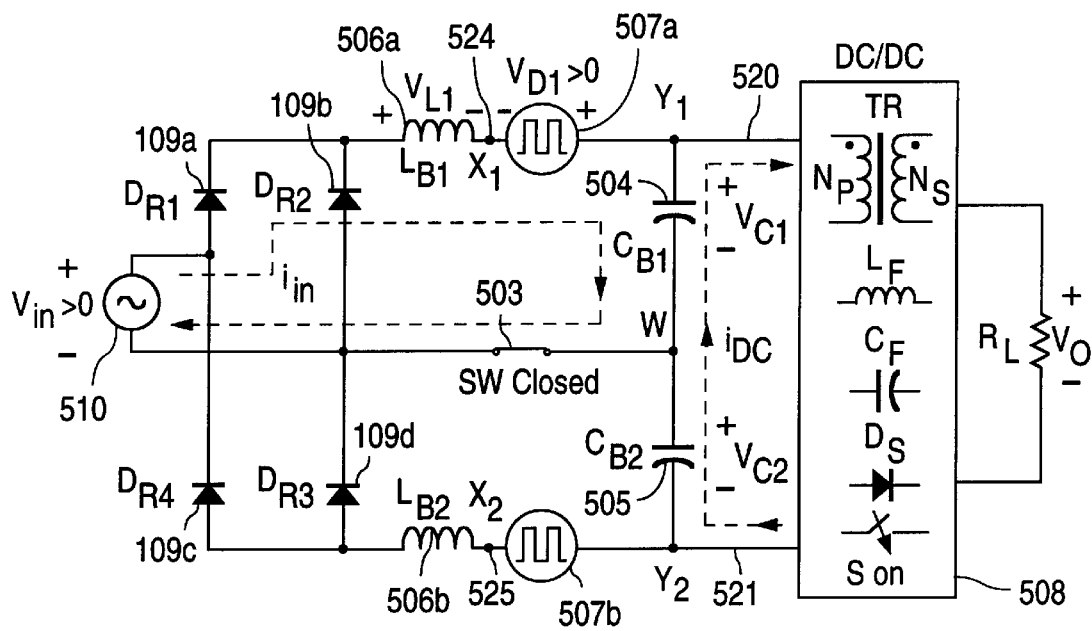
FIGS. 8(a)–8(d) show the operation modes of converter 500 of FIG. 5 at a low line-range (e.g., connected to the 100/120 V AC power line).
Figure 8B:
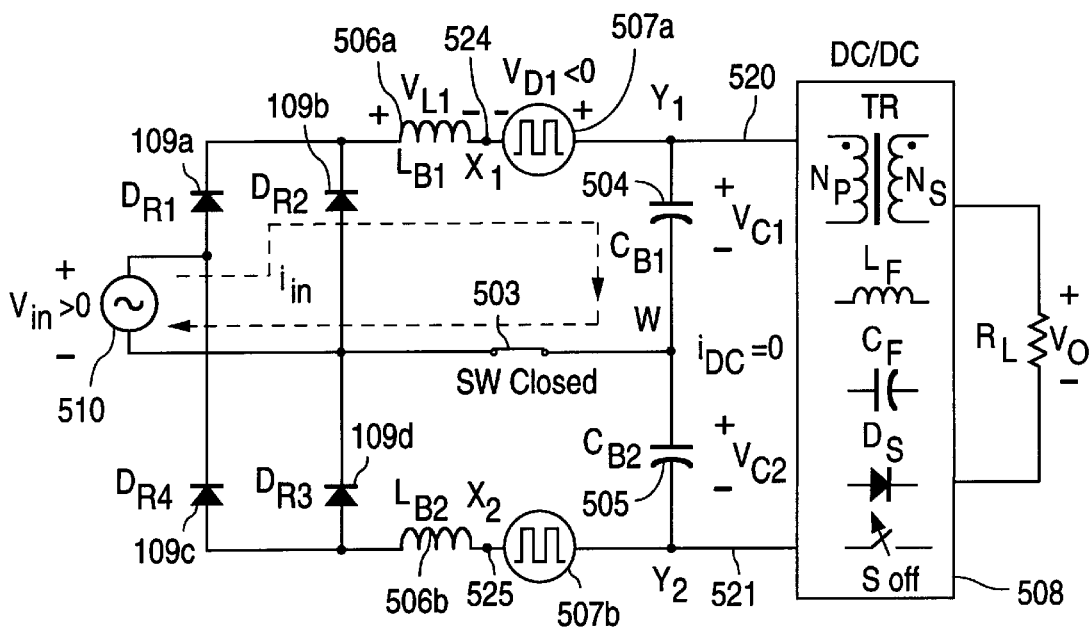

As shown in FIG. 8(a), during a positive half cycle of the line voltage, with the switch in DC/DC power stage 508 (e.g., switch 702 of FIG. 7) closed, voltage $V_{D1}$ across dither source 507a is at its maximum (i.e., $V_{D1} = V_{D1max} > 0$, where $V_{D1max} < (V_{C1} + V_{C2})/2 \approx V_{C1}$; $V_{C1}$ and $V_{C2}$ being the voltages across storage capacitors 504 and 505, respectively) and opposes voltage $V_{C1}$ across storage capacitor 504. If the instantaneous line voltage is larger than the difference between voltage $V_{C1}$ across storage capacitor 504 and voltage $V_{D1max}$ across dither source 507a (i.e., $v_{in} > V_{C1} - V_{D1max}$), then voltage $V_{L1}$ across boost inductor 506a (given by $v_{L1} = v_{in} + V_{D1max} - V_{C1}$) is positive and line current $i_{in}$ increases, thereby storing energy in boost inductor 506a. (Line current $i_{in}$ cannot flow until the instantaneous line voltage is smaller than the difference between voltage $V_{C1}$ across storage capacitor 504 and voltage $V_{D1max}$ across dither source 507a, thereby resulting in a distortion of the line current around zero crossing.) At the same time, input current $i_{DC}$ flowing into DC/DC power stage 508 is provided by storage capacitors 504 and 505. When the switch in DC/DC power stage 508 opens (FIG. 8(b)), input current $i_{DC}$ into DC/DC power stage 508 falls to zero, and, in addition, voltage $v_{D1}$ across dither source 507a changes sign (i.e., $V_{D1}=V_{D1min}<0$), thus increasing the total voltage opposing the line voltage. Consequently, voltage $v_{L1}$ across boost inductor 506a (given by $v_{L1}=v_{in}-|V_{D1min}|-V_{C1}$) becomes negative, current $i_{in}$ decreases, and boost inductor 506a discharges. During boost inductor 506a's discharging period, the energy stored in the magnetic field of boost inductor 506a is transferred to storage capacitor 504.

Figure 8C:
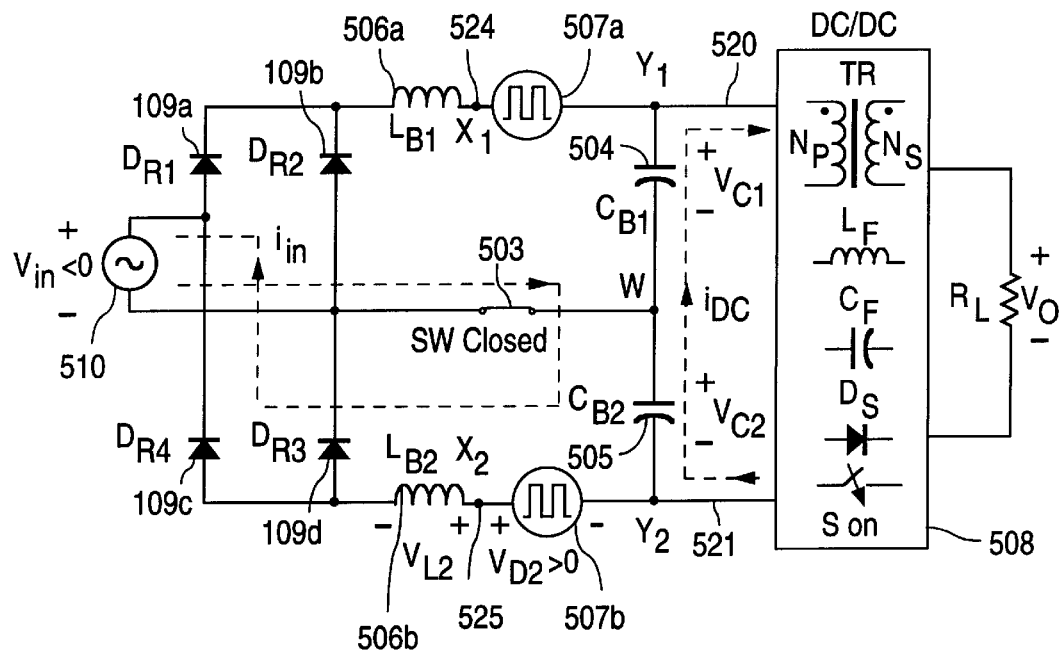
Figure 8D:
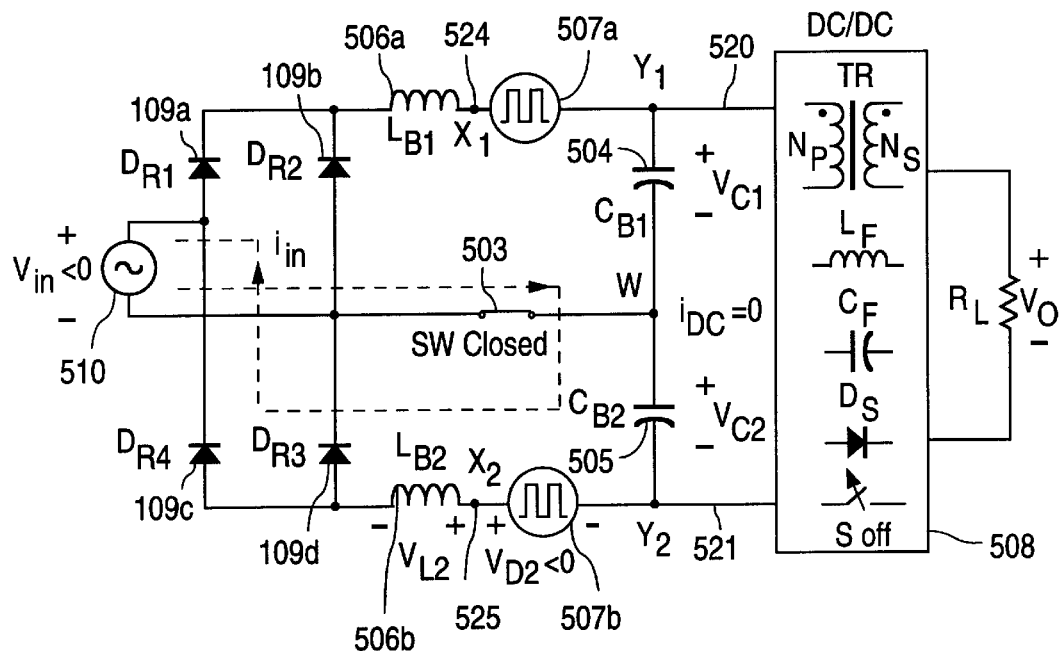

During a negative half cycle of the line voltage, $S^2ICS$ converter 500 operates in a similar manner as during a positive half cycle, except that diode 109c, boost inductor 506b, and dither source 507b are active, as illustrated in FIGS. 8(c) and 8(d).

When $S^2ICS$ converter 500 of FIG. 5 operates in a high line-range (i.e., from a 220/240 V AC power line), range-select switch 503 is open and the front-end portion of converter 500 operates as a conventional full-bridge rectifier. As shown in FIGS. 9(a)–9(d), when operating in the conventional full-bridge-rectifier mode, boost inductors 506a and 506b, dither sources 507a and 507b, and storage capacitors 504 and 505 are connected in series.

Figure 9A:
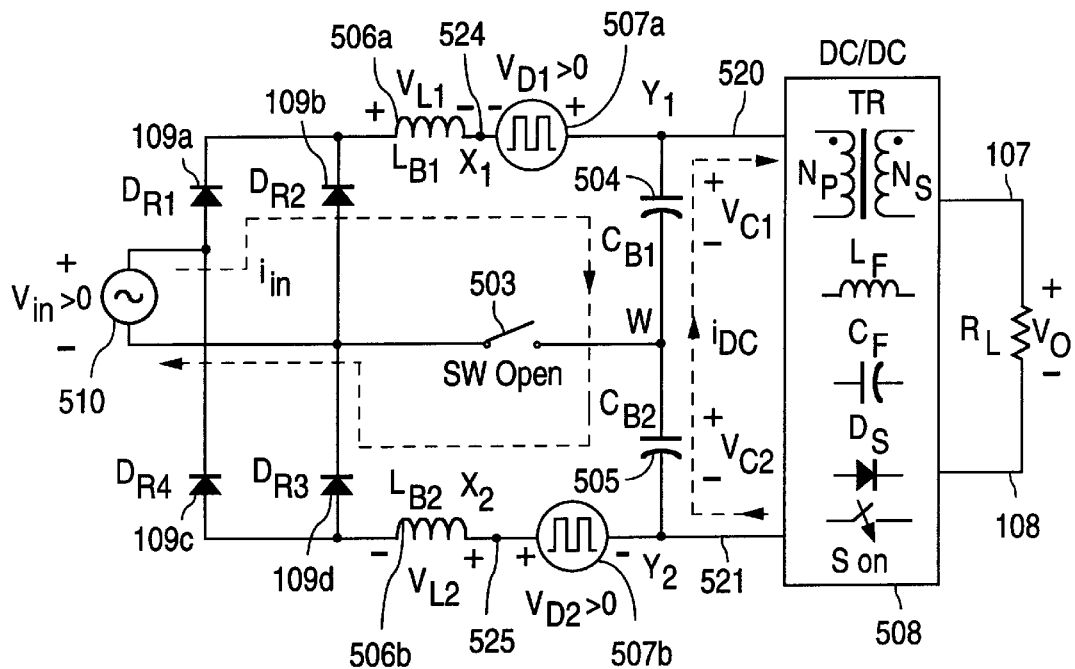
FIGS. 9(a)–9(d) show the operation modes of converter 500 of FIG. 5 at a high line-range (e.g., connected to the 220/240 V AC power line).
Figure 9B:
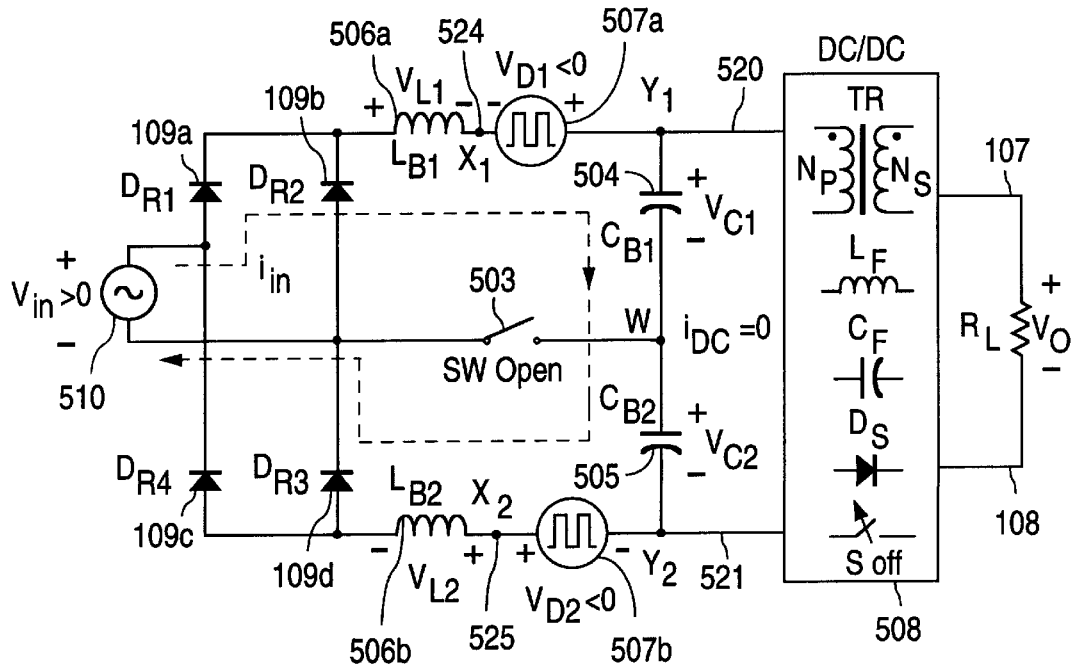
Figure 9C:
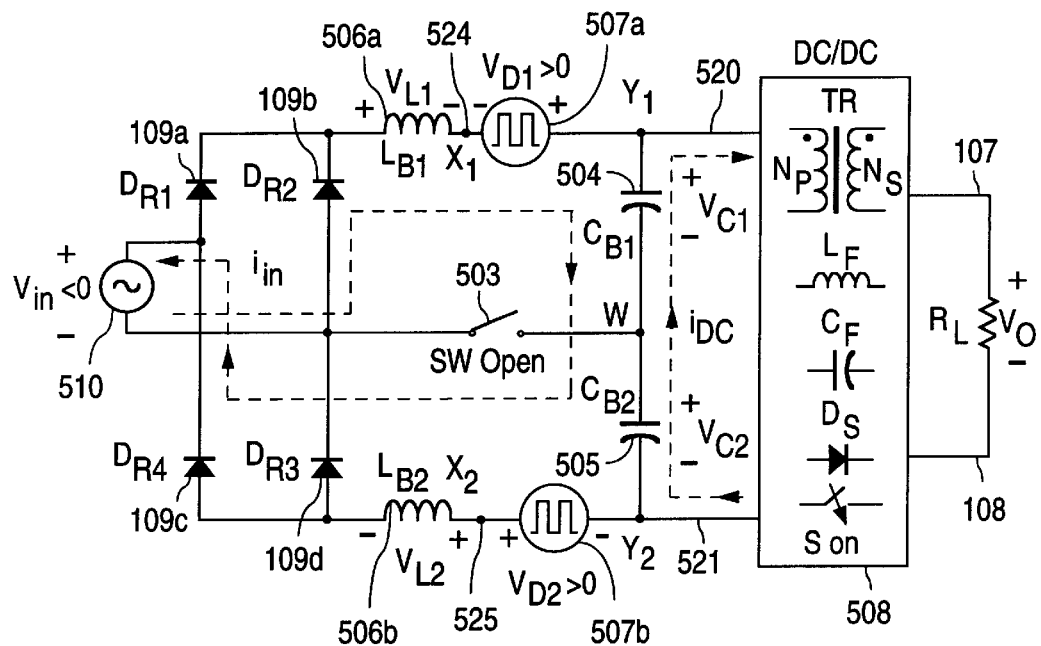
Figure 9D:
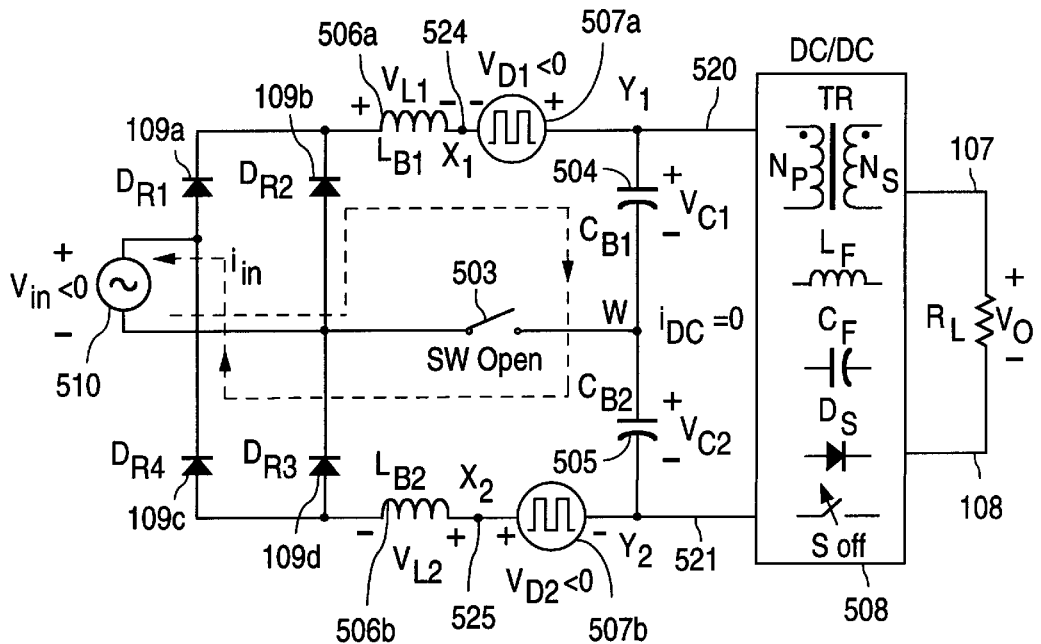

As shown in FIG. 9(a), during a positive half cycle of the line voltage, with the switch in DC/DC power stage 508 (e.g., switch 702 of FIG. 7) closed, voltages $v_{D1}$ and $V_{D2}$ across dither sources 507a and 507b are each at their maximum (i.e., $v_{D1}=V_{D1max}>0$ and $v_{D2}=V_{D2max}>0$, where $V_{D1max} \approx V_{D2max}<(V_{C1}+V_{C2})/2$), opposing voltages $V_{C1}$ and $V_{C2}$ across storage capacitors 504 and 505, respectively. If the instantaneous line voltage is larger than the difference between the sum of voltages $V_{C1}$ and $V_{C2}$ across storage capacitors 504 and 505, and the sum of voltages $V_{D1max}$ and $V_{D2max}$ across dither sources 507a and 507b (i.e., $v_{in} > V_{C1} + V_{C2} - (V_{D1max} + V_{D2max})$), then the sum of voltages $v_{L1}$ and $v_{L2}$ across boost inductors 506a and 506b, i.e., $v_{L1}+v_{L2}=v_{in}+(V_{D1max}+V_{D2max})-(V_{C1}+V_{C2})$, is positive and line current $i_{in}$ through boost inductors 506a and 506b increases. (Line current $i_{in}$ cannot flow until the instantaneous line voltage is smaller than the difference between the sum of voltages $V_{C1}$ and $V_{C2}$ across storage capacitors 504 and 505, and the sum of voltages $V_{D1max}$ and $V_{D2max}$ across dither sources 507a and 507b, thereby resulting in a distortion of the line current around zero crossing.) Consequently, the increased current $i_{in}$ stores energy in the magnetic fields of boost inductors 506a and 506b. At the same time, DC/DC power stage 508 draws current $i_{DC}$ from the serially connected storage capacitors 504 and 505. When the switch in DC/DC power stage 508 opens (FIG. 9(b)), current $i_{DC}$ falls to zero. Simultaneously, voltages $v_{D1}$ and $v_{D2}$ across dither sources 507a and 507b change sign (i.e., $v_{D1}=V_{D1min}<0$ and $v_{D2}=V_{D2min}<0$), thus increasing the total voltage opposing the line voltage. Consequently, the sum of voltages $v_{L1}$ and $v_{L2}$ across boost inductors 506a and 506b (i.e., $v_{L1}+v_2=v_{in}-|V_{D1min}+V_{D2min}|-(V_{C1}+V_{C2})$) becomes negative, thus decreasing the line current $i_{in}$ and transferring the energy stored in boost inductors 506a and 506b to storage capacitors 504 and 505.

The operation of $S^2ICS$ converter 500 during a negative half cycle of the line voltage, in the conventional full-bridge rectifier mode, is similar to the corresponding operation during a positive half cycle of the line voltage, described above in conjunction with FIGS. 9(a) and 9(b), except that during a negative half cycle of the line voltage, rather than rectifiers 109a and 109c, rectifiers 109b and 109c conduct line current $i_{in}$ Since windings 614 and 615 within dither sources 507a and 507b are magnetically coupled to the transformer windings in DC/DC power converter stage 508, windings 614 and 615 can be used to directly transfer energy from the input terminals to the load. Winding 614 provides direct energy transfer with the forward-type DC/DC power stages. The amount of the directly transferred energy is proportional to the ratio of the difference between half the number of turns $N_p$ of the primary winding and the number of turns $N_1$ of winding 614, to half the number of turns $N_p$ of the primary winding (i.e., $(N_p/2-N_1)/(N_p/2)$). If the number of turns $N_1$ of winding 614 is equal to half the number of turns $N_p$ of the primary winding, no energy is directly transferred from the input to the output, which reduces the conversion efficiency.

As the number of turns $N_1$ of winding 614 decreases (i.e., $N_1<N_p/2$), the harmonic content of the line current increases. Therefore, the selection of ratio $N_1/(N_p/2)$ is based on a trade-off between the conversion efficiency and the line-current harmonic content. Winding 615 provides direct energy transfer with the flyback-type DC/DC power stages. The amount of the directly transferred energy is proportional to the ratio of the number of turns $N_2$ of winding 615 to half the number of turns $N_p$ of the primary winding (where, $N_2<N_p/2$). Clearly, when the number of turns $N_2$ of winding 615 is equal to zero, no energy is directly transferred from the input to the output, which reduces the conversion efficiency. Conversely, as the number of turns $N_2$ of winding 615 increases and more energy is directly transferred from input to output, the output-voltage ripple at the rectified line frequency increases, because the directly transferred energy from input to output contains a strong second harmonic of the line voltage. Therefore, the selection of ratio $N_2/(N_p/2)$ is based on a trade-off between the conversion efficiency and the output voltage ripple.

Figure 10:
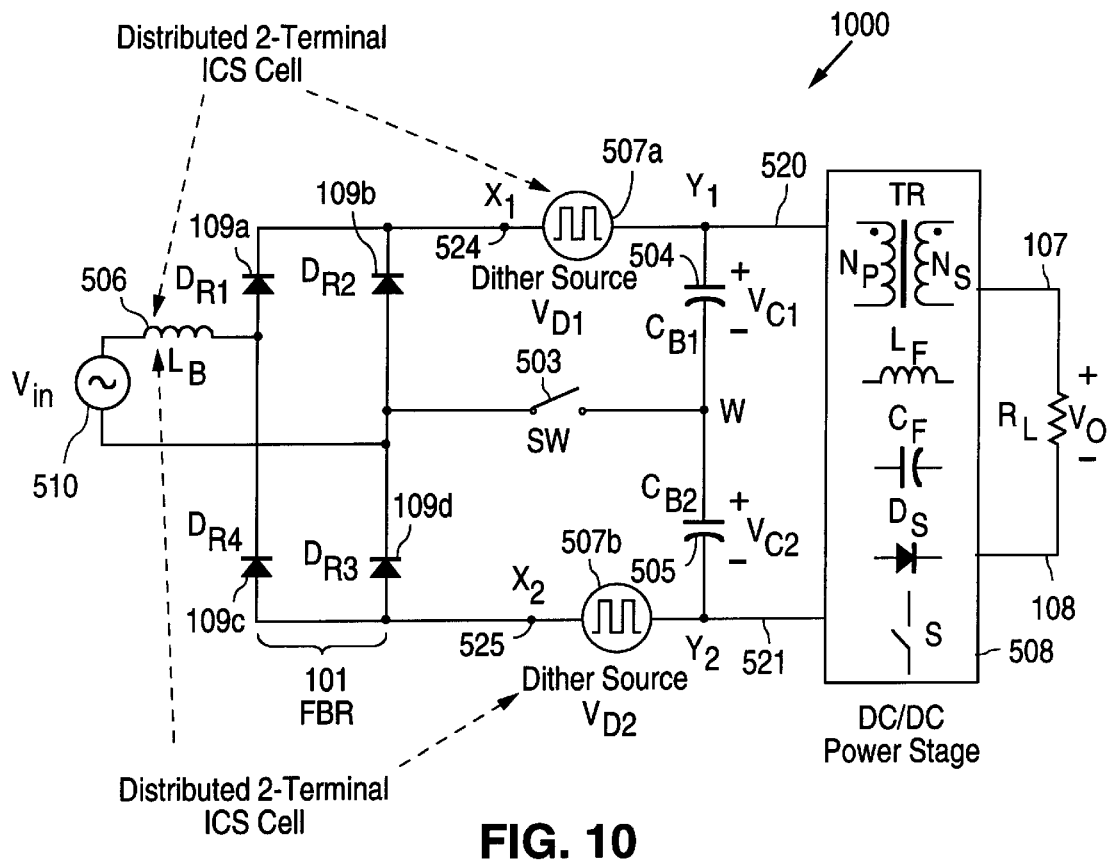
FIG. 10 shows converter 1000, which is a variation of converter 500 of FIG. 5, having a single boost inductor 506 on the AC side of full-bridge rectifier 101 (i.e., having a distributed 2-terminal ICS cells).

A variation of $S^2ICS$ converter 500 of FIG. 5 is converter 1000, which is shown in FIG. 10. In converter 1000, a single boost inductor 506 is placed on the AC side of full-bridge rectifier 101, instead of having two boost inductors 506a and 506b on the DC side of full-bridge rectifier 101, as in converter 500 of FIG. 5. In converter 1000, the ICS cells are distributed since AC-side boost inductor 506 and dither sources 507a and 507b are physically separated by full-bridge rectifier 101. Unlike converter 500, in converter 1000, input voltage source 510 sees the same boost inductance at both the low line-range (i.e., when range-select switch 503 is closed) and the high line-range (i.e., when range-select switch 503 is open). In contrast, in converter 500, the boost inductance seen by input voltage source 510 at the high-line range is twice the boost inductance seen by input voltage source 510 at the low line-range.

Figure 6A:
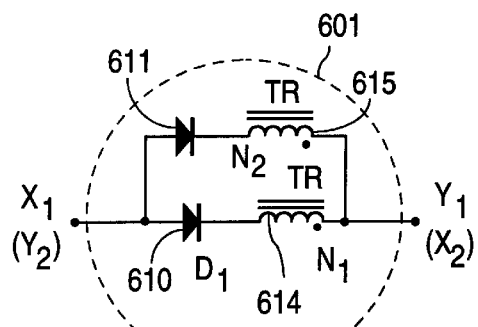
FIGS. 6(a)–6(g) show various dither sources 601–607 that can be employed to implement dither sources 507a and 507b in 2-terminal ICS cells 501a and 501b in converter 500 of FIG. 5.
Figure 6B:
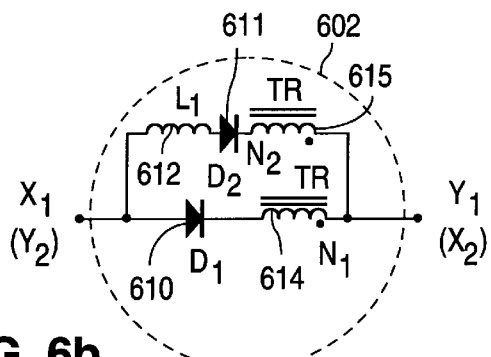
Figure 6C:
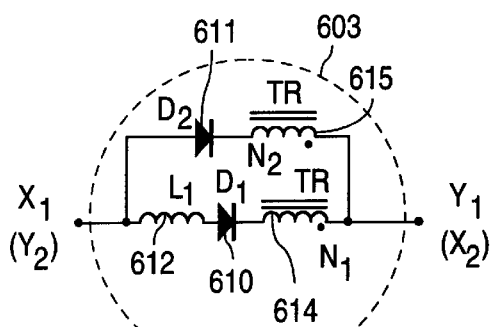
Figure 6D:
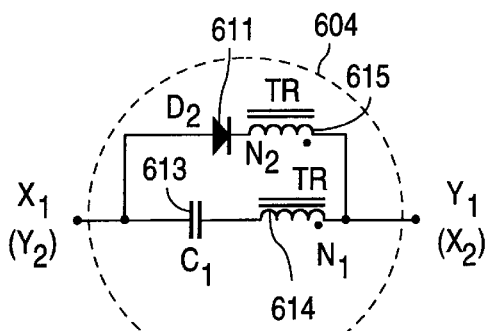
Figure 6E:
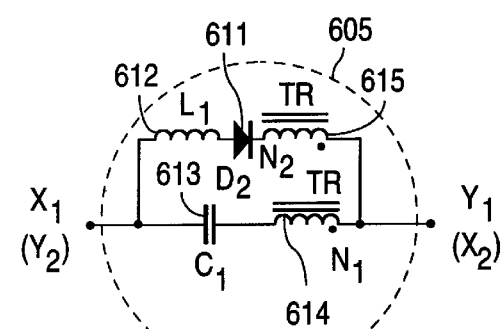
Figure 6F:
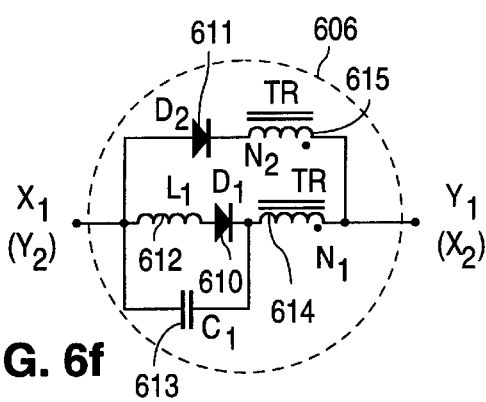
Figure 6G:
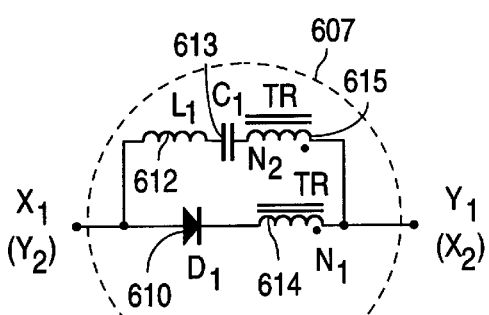
Figure 7A:
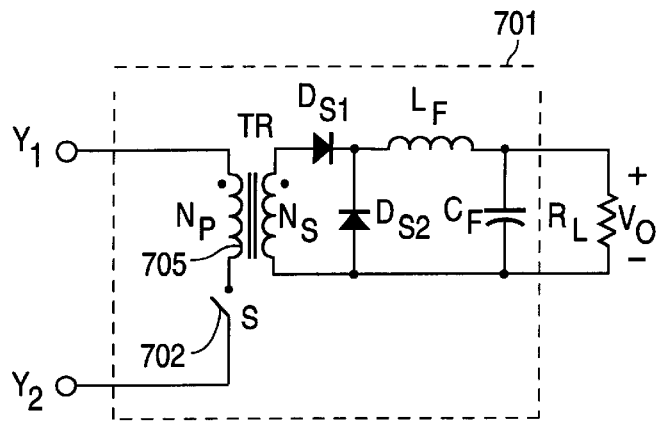
FIGS. 7(a)–7(d) show examples of DC/DC power converter stages that can implement DC/DC power converter stage 508 of FIG. 5.
Figure 7B:
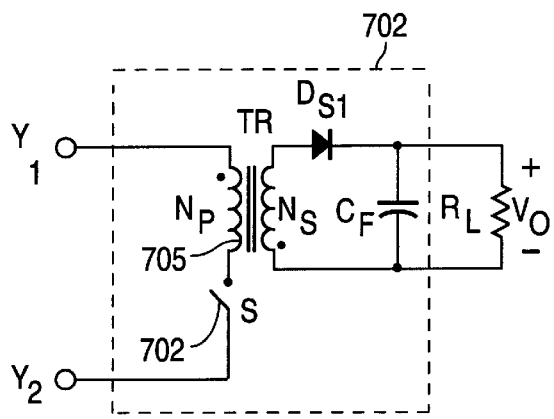
Figure 7C:
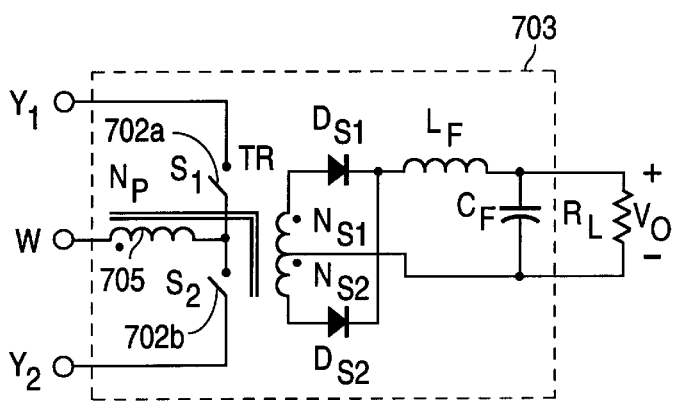
Figure 7D:
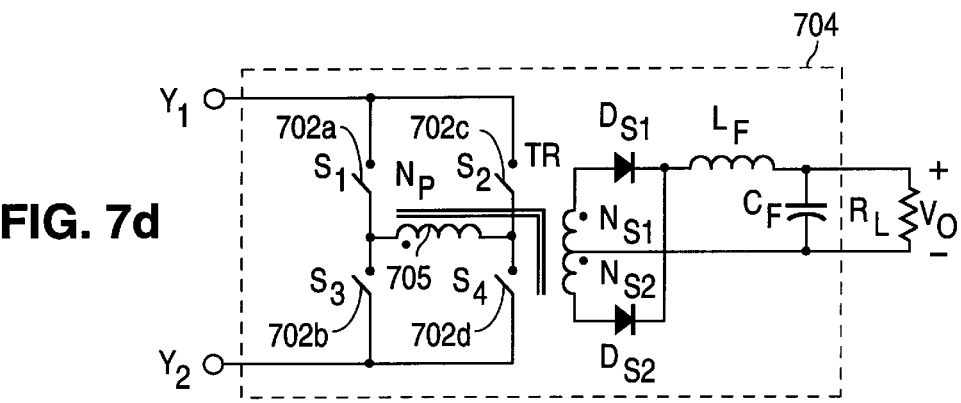
Figure 12A:
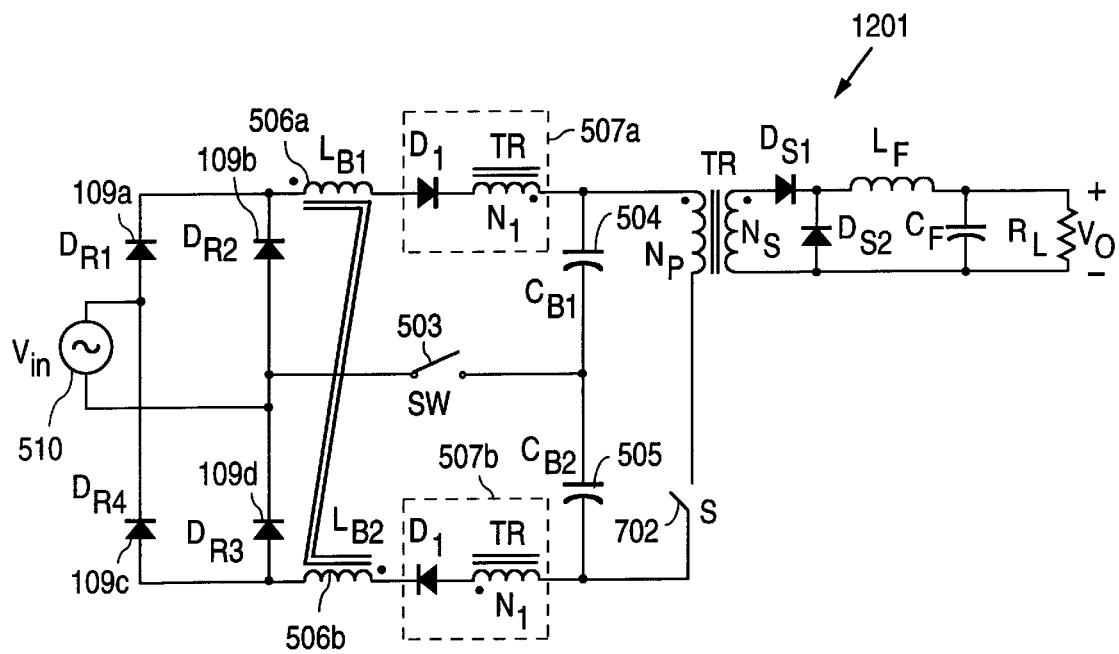
FIGS. 12(a)–12(d) shows converters 1201 and 1203, and converters 1202 and 1204, which are exemplary converters implementing converter 1100 of FIG. 11 and converter 1000 of FIG. 10, respectively.
Figure 12B:
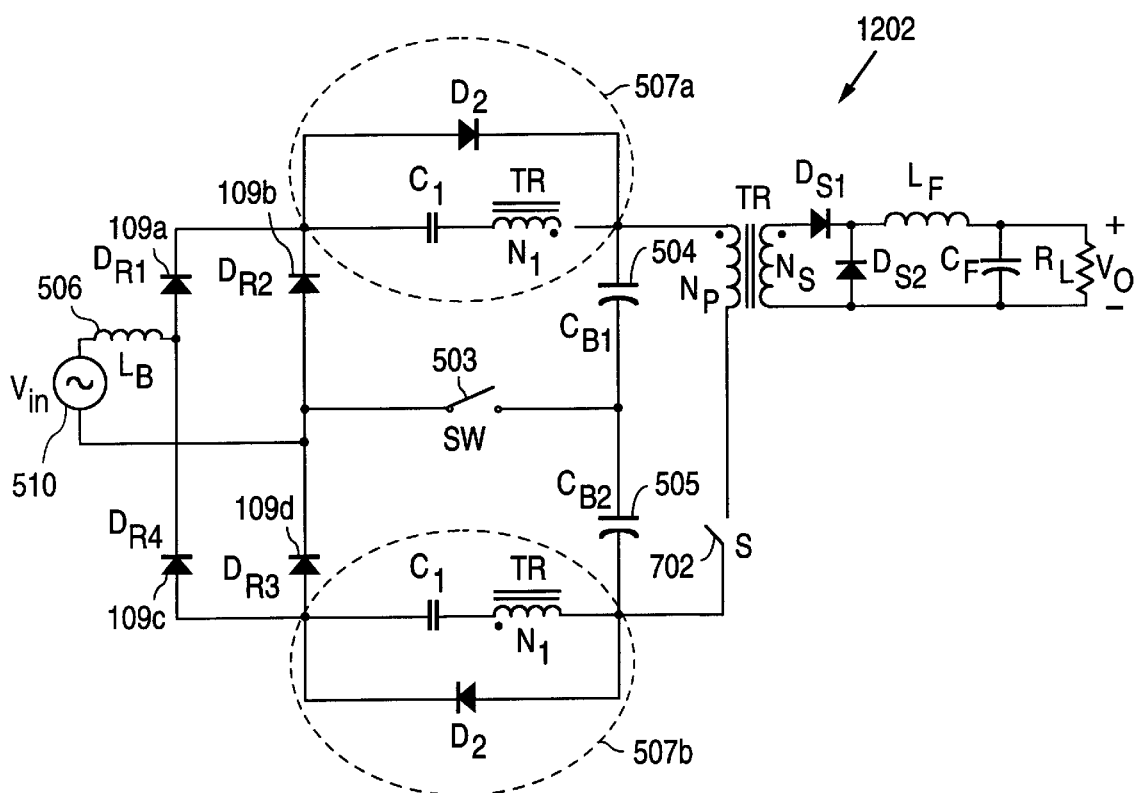
Figure 12C:
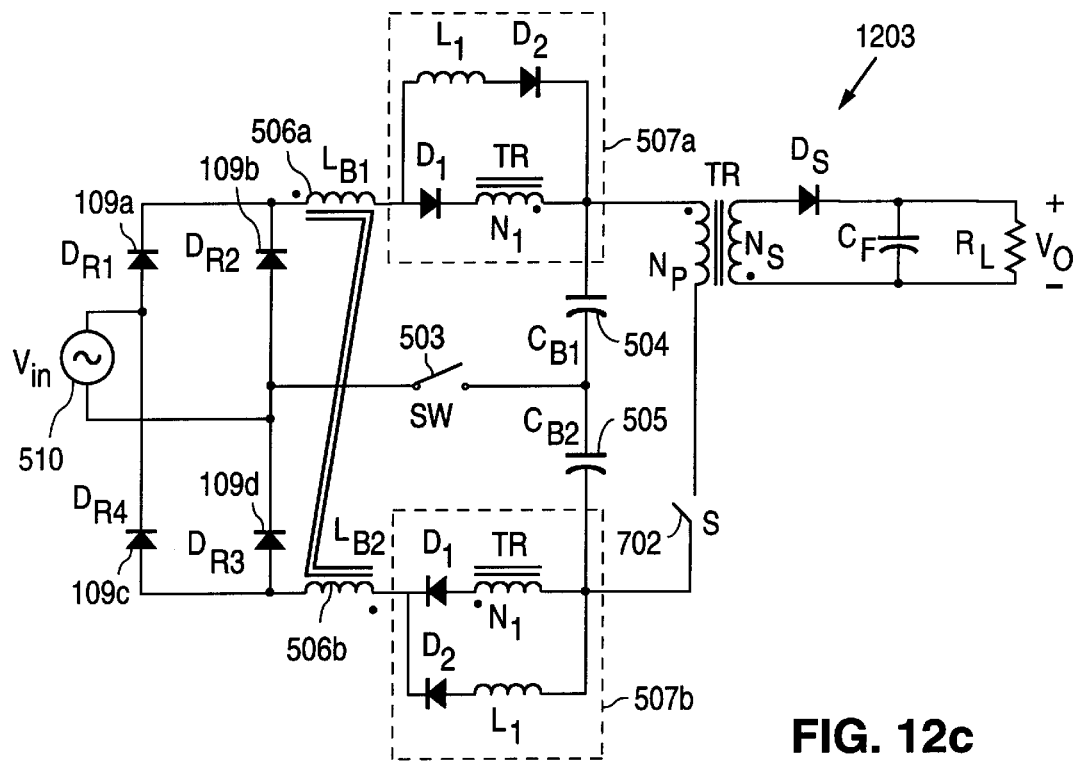
Figure 12D:
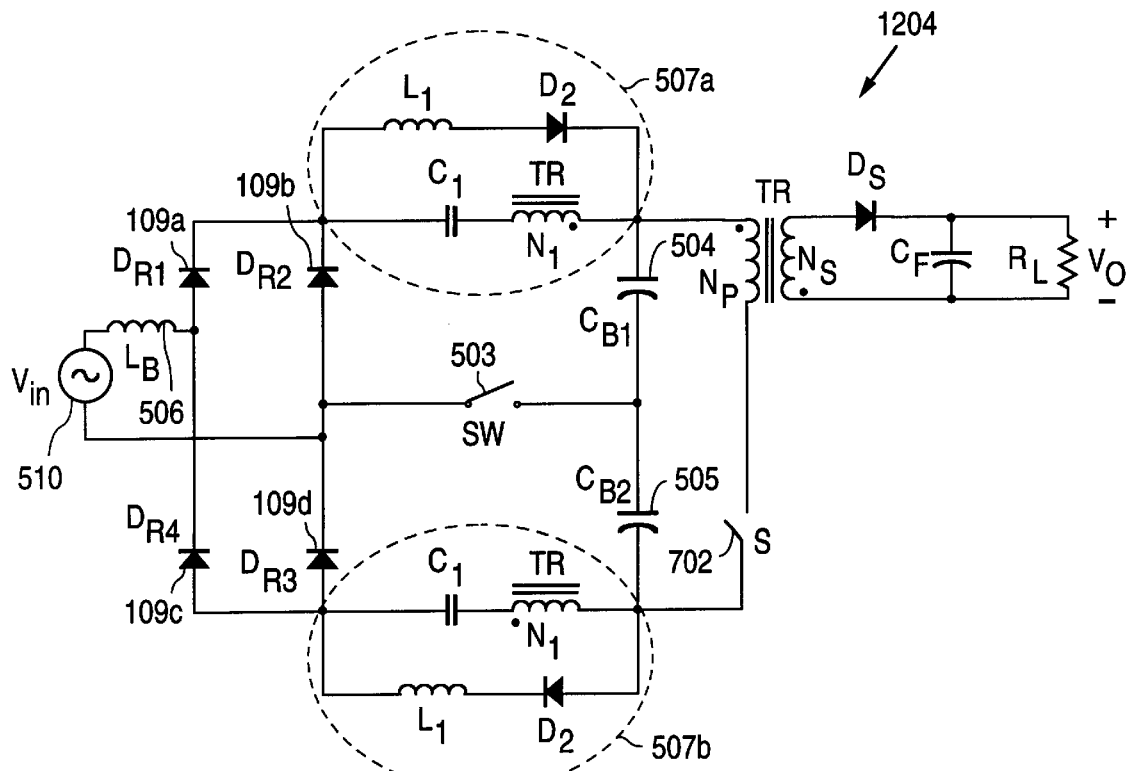

Converters 1202 and 1204 in FIGS. 12(b) and 12(d) are exemplary converters implementing converter 1000, using a forward DC/DC converter stage with dither CCM voltage sources 604 of FIG. 6(d) (with the number of turns $N_2$ of winding 615 equal to zero), and a flyback DC/DC converter stage with dither CCM voltage/current sources 605 of FIG. 6(e) (with the number of turns $N_2$ of winding 615 equal to zero), respectively.

Figure 11:
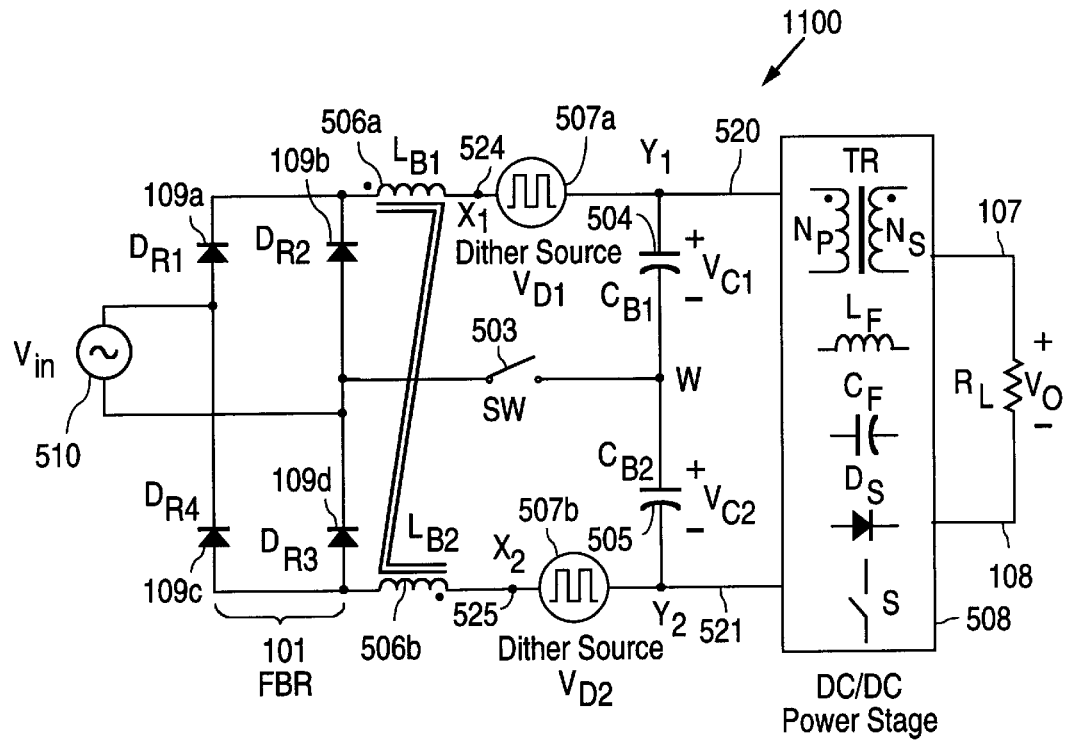
FIG. 11 shows converter 1100, which is a variation of converter 500 of FIG. 5, having coupled DC-side boost inductors 506a and 506b.

Another variation of $S^2ICS$ converter 500 of FIG. 5 is converter 1100, which is shown in FIG. 11. In converter 1100, boost inductors 506a and 506b are implemented as coupled inductors using a single core. The leakage inductance of the coupled boost inductors 506a and 506b of converter 1100 in FIG. 11 acts as a high-frequency, common-mode electromagnetic interference (EMI) choke which helps in reducing the EMI noise. Converters 1201 and 1203 in FIGS. 12(a) and 12(c) are exemplary converters implementing converter 1100, using a forward DC/DC converter stage with dither DCM sources 601 of FIG. 6(*a*) with the number of turns $N_2$ of windings 615 equal to the number of turns $N_1$ of windings 614, and a flyback DC/DC converter stage with dither CCM current sources 602 of FIG. 6(*b*) (with the number of turns $N_2$ of winding 615 equal to zero), respectively.

FIG. 13 shows another embodiment of the present invention in S²ICS converter 1300. As shown in FIG. 13, converter 1300 has a voltage-doubler front-end and 3-terminal ICS cells 1301*a* and 1301*b*. Each of 3-terminal ICS cells 1301*a* and 1301*b* includes a boost inductor (e.g., boost inductor 506*a*) and a 3-terminal dither source (e.g., dither source 1307*a*) connected in series. Unlike dither sources 507*a* and 507*b* in 2-terminal ICS cells 501*a* and 502 of FIG. 5, however, dither sources 1307*a* and 1307*b* in 3-terminal ICS cells 1301*a* and 1301*b* are each connected to DC/DC power stage 1308 at two connection points: terminals 520 and 522 for dither source 1301*a* and terminals 521 and 523 for dither source 1301*b*. In 2-terminal ICS cells 501*a* and 502 of FIG. 5, boost inductors 506*a* and 506*b* each charge and discharge through the same terminals, i.e., terminals 520 and 521, respectively. In 3-terminal ICS cells 1301*a* and 1301*b* of FIG. 13, boost inductors 506*a* and 506*b* each charge and discharge through two different terminals: boost inductor 506*a* charges through terminal 522 and discharges through terminal 520, and boost inductor 506*b* charges through terminal 523 and discharges through terminal 521.

Because of the different charging and discharging terminals of boost inductors 506*a* and 506*b* in 3-terminal ICS cells 1301*a* and 1301*b* of FIG. 13, dither sources 1307*a* and 1307*b* are different from dither sources 507*a* and 507*b* in 2-terminal ICS cells 501*a* and 501*b* of FIG. 5 (shown in FIG. 6). FIGS. 14(*a*)–14(*g*) show 3-terminal dither sources 1401–1407 suitable for implementing dither source 1307*a* of FIG. 13. Dither sources suitable for implementing dither source 1307*b* of FIG. 13 differ from dither sources 1401–1407 of FIGS. 14(*a*)–14(*b*) by the polarity of the diodes and the polarity of windings 614 and 615 of the transformer in DC/DC converter stage 1308. FIGS. 14(*a*)–14(*g*) show, respectively, (a) DCM source 1401, (b) CCM current source 1402, (c) CCM current source 1403, (d) CCM voltage source 1404, (e) CCM voltage/current source 1405, (f) CCM voltage/current source 1406, and (g) CCM resonant source 1407.

Unlike converter 500 of FIG. 5, however, converter 1300 of FIG. 13 can include as DC/DC converter stage 1308 only a single-ended DC/DC converter stage such as forward converter 1501 and flyback converter 1502, shown in FIGS. 15(*a*) and 15(*b*), respectively. As shown in FIGS. 15(*a*) and 15(*b*), because of the required symmetry of DC/DC converter stage 1308 (i.e., coupling to 3-terminal ICS cells 1301*a* and 1301*b* substantially identically), the primary winding of transformer 1504 is split in half (i.e., divided between two identical windings 1505*a* and 1505*b*) and primary switch 702 is connected between windings 1505*a* and 1505*b*.

Windings 614 and 615 within dither sources 1307*a* and 1307*b* reduce the voltage of storage capacitors 504 and 505. When boost inductors 506*a* and 506*b* charge, the voltage across windings 614 opposes the rectified line voltage. To keep the same volt-second product across boost inductors 506*a* and 506*b*, a larger duty cycle is necessary, which results in reduced voltage across storage capacitors 504 and 505. When boost inductors 506*a* and 506*b* discharge, the voltage across windings 615 is in the same direction as the voltage across storage capacitors 504 and 505. Therefore, windings 615 effectively increase the reset voltage across boost inductors 506*a* and 506*b*. However, because each of boost inductors 506*a* and 506*b* in 3-terminal ICS cells 1301*a* and 1301*b* charges and discharges through different terminals, converter 1300 of FIG. 13 operates even when the number of turns $N_1$ and the number of turns $N_2$ of windings 614 and 615, respectively, within dither sources 1307*a* and 1307*b* are zero.

FIGS. 16(*a*)–16(*d*) and 17(*a*)–17(*d*) show, respectively, the operation modes of S²ICS converter 1300 of FIG. 13 at a low line-range (i.e., connected to the 100/120 V AC power line) and at a high line-range (i.e., connected to the 220/240 V AC power line). In low line-range operations (i.e., FIGS. 16(*a*)–16(*d*)), range-select switch 503 is closed and the front end of converter 1300 operates in the voltage-doubler mode. Under the voltage-doubler mode, diode 109*a*, boost inductor 506*a*, and dither source 1307*a* are active during a positive half cycle of the line voltage (i.e., voltage $v_{in} > 0$), and diode 109*c*, boost inductor 506*b*, and dither source 1307*b* are active during a negative half cycle of the line voltage (i.e., voltage $v_{in} < 0$).

As shown in FIG. 16(*a*), during a positive half cycle of the line voltage, with the switch in DC/DC power stage 1308 (e.g., switch 702 of FIG. 15) closed, voltage $v_{D1(XZ)}$ across dither source 1307*a*, between terminals 524 and 522, is positive (given by $V_{D1(XZ)} = V_{D1(XZ)} < (V_{C1}+V_{C2})/2$), opposing the line voltage. If the instantaneous line voltage is larger than the voltage between terminals 524 and 526 (given by $v_{XW} = V_{D1(XZ)} + (V_{C1}-V_{C2})/2 \approx V_{D1(XZ)}$), then voltage $v_{L1}$ across boost inductor 506*a* (given by $v_{L1} = v_{in} - V_{D1(XZ)} - (V_{C1}-V_{C2})/2 \approx v_{in} - V_{D1(XZ)}$) is positive and line current $i_{in}$ increases. The increased line current $i_{in}$ stores energy in boost inductor 506*a*. (Line current iin cannot flow until the instantaneous line voltage is smaller than the voltage across terminals 524 and 526, thereby resulting in a distortion of the line current around zero crossing.) At the same time, input current $i_{DC}$ into DC/DC power stage 1308 is provided by storage capacitors 504 and 505. When the switch in DC/DC power stage 1308 opens (FIG. 16(*b*)), input current $i_{DC}$ into DC/DC power stage 1308 falls to zero, and voltage $v_{D1(XY)}$ across terminals 524 and 520 becomes positive, thereby increasing the total voltage opposing the line voltage. Consequently, voltage $v_{L1}$ across boost inductor 506*a* (given by $v_{L1} = v_{in} - V_{D1(XY)} - V_{C1}$) becomes negative, current $i_{in}$ decreases, and boost inductor 506*a* discharges. During the discharging period of boost inductor 506*a*, the energy stored in the magnetic field of boost inductor 506*a* is transferred to storage capacitor 504.

During a negative half cycle of the line voltage, S²ICS converter 1300 operates in a similar manner as during a positive half cycle, except that diode 109*c*, boost inductor 506*b*, and dither source 1307*b* are active, as illustrated in FIGS. 16(*c*) and 16(*d*).

When S²ICS converter 1300 of FIG. 13 operates in the high-voltage range (i.e., from the 220/240 V AC power line), range-select switch 503 is open and the front-end portion of converter 500 operates as a conventional full-bridge rectifier. As shown in FIGS. 17(*a*)–(*d*), when operating in the conventional full-bridge-rectifier mode, boost inductors 506*a* and 506*b*, dither sources 1307*a* and 1307*b* and storage capacitors 504 and 505 are connected in series.

As shown in FIG. 17(*a*), during a positive half cycle of the line voltage with the switch in DC/DC power stage 1308 (e.g., switch 702 of FIG. 15) closed, voltage $v_{D1(XZ)}$ across dither source 1307*a* between terminals 524 and 522, and voltage $v_{D2(ZX)}$ across dither source 1307*b* between terminals 523 and 525 are positive, opposing the line voltage. If the instantaneous line voltage is larger than the voltage between terminals 524 and 525 (given by $v_{xx}V_{D1(XZ)}+V_{D2(ZX)}$), then the sum of voltages $v_{L1}$ and $v_{L2}$ across boost inductors 506a and 506b, i.e., $v_{L1}+v_{L2}=V_{in}-(V_{D1(XZ)}+V_{D2(ZX)})$, is positive and line current $i_{in}$ through boost inductors 506a and 506b increases. (Line current $i_{in}$ cannot flow until the instantaneous line voltage is smaller than the voltage between terminals 524 and 525, which results in a distortion of the line current around zero crossing.) Consequently, energy is stored in the magnetic fields of boost inductors 506a and 506b. At the same time, DC/DC power converter stage 1308 draws current $i_{DC}$ from the serially connected storage capacitors 504 and 505. When the switch in DC/DC power stage 1308 opens (FIG. 17(b)), input current $i_{DC}$ into DC/DC power stage 1308 falls to zero, and, in addition, voltage $v_{D1(XY)}$ across dither source 1307a between terminals 524 and 520, and voltage $V_{D2(YX)}$ across dither source 1307b between terminals 521 and 525, become positive, increasing the total voltage opposing the line voltage. Consequently, the sum of voltages $v_{L1}$ and $v_{L2}$ across boost inductors 506a and 506b, i.e., $v_{L1}+v_{L2}=V_{in}-(V_{D1(XY)}+V_{D2(YX)})-(V_{C1}+V_{C2})$, becomes negative, thus decreasing the line current and causing the energy stored in boost inductors 506a and 506b to be transferred to storage capacitors 504 and 505.

The operation of S²ICS converter 1300 during a negative half cycle of the line voltage and in the conventional full-bridge rectifier mode is similar to the corresponding operation during a positive half cycle of the line voltage, described above in conjunction with FIGS. 17(a) and 17(b), except that during a negative half cycle of the line voltage, rather than rectifiers 109a and 109d, rectifiers 109b and 109c conduct line current $i_{in}$.

Since windings 614 and 615 within dither sources 1307a and 1307b are magnetically coupled to the transformer windings in DC/DC power stage 1308, windings 614 and 615 can be used to directly transfer energy from the input terminals to the load. Winding 614 provides direct energy transfer with the forward DC/DC power stage. The amount of the directly transferred energy is proportional to the ratio of the number of turns $N_1$ of winding 614 to half the number of turns $N_p$ of the split primary winding (where, $N_2<N_p/2$). If the number of turns $N_1$ of winding 614 is zero, no energy is directly transferred from the input to the output, which reduces the conversion efficiency. As the ratio $N_1/(N_p/2)$ increases, the harmonic content of the line current increases. Therefore, the selection of the ratio $N_1/(N_p/2)$ is based on a trade-off between the conversion efficiency and the line-current harmonic content. Winding 615 provides direct energy transfer from the input to the load, through the flyback DC/DC power stage, in a manner similar to S²ICS converter 500 of FIG. 5 with 2-terminal ICS cells.

Figure 18A:
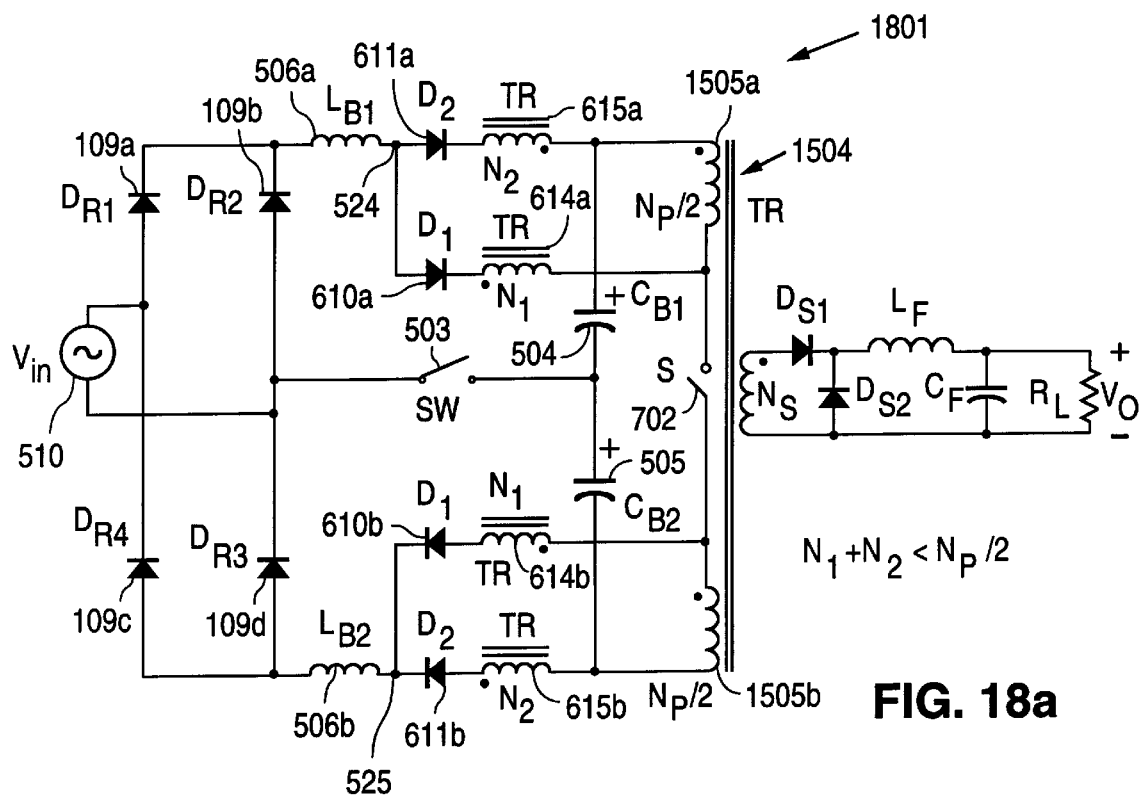
FIGS. 18(a) and (b) show implementations 1801 and 1802 of converter 1300 of FIG. 13, using dither DCM sources 1401 of FIG. 14(a), in which windings 614 and 615 are implemented, respectively, as additional windings coupled to transformer 1504 and as portions of split primary windings 1505a and 1505b of transformer 1504.
Figure 18B:
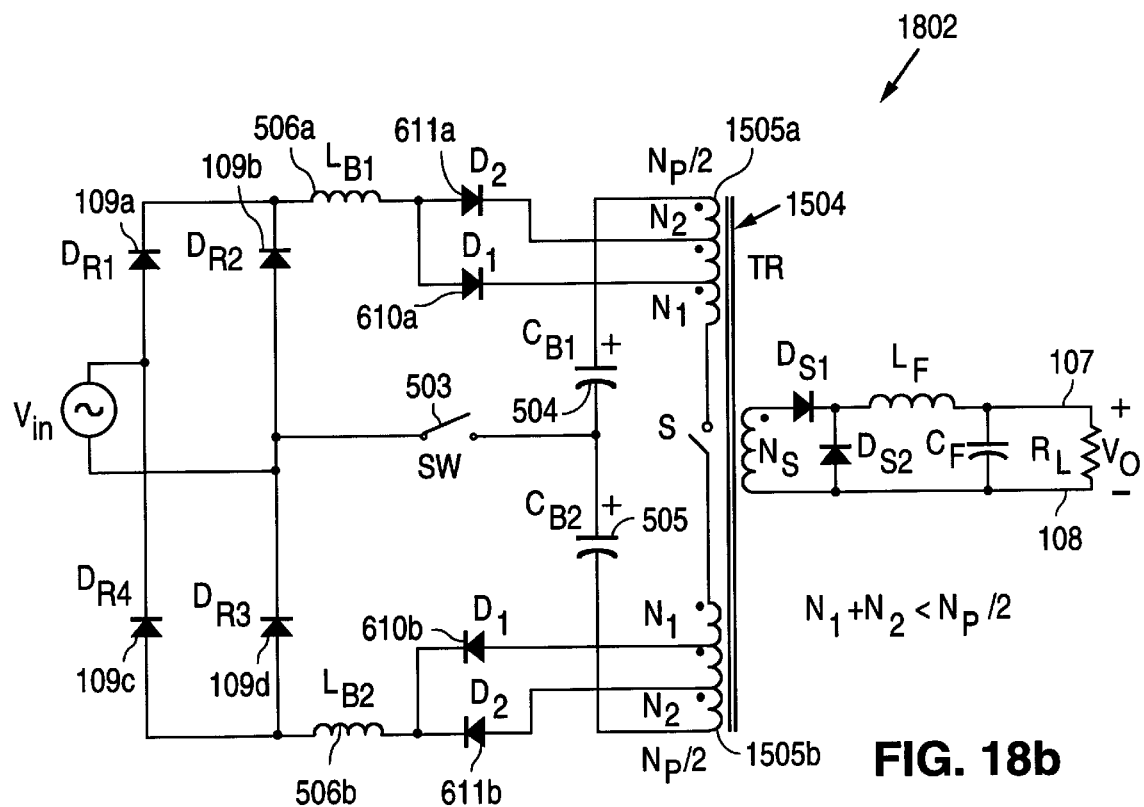
Figure 19A:
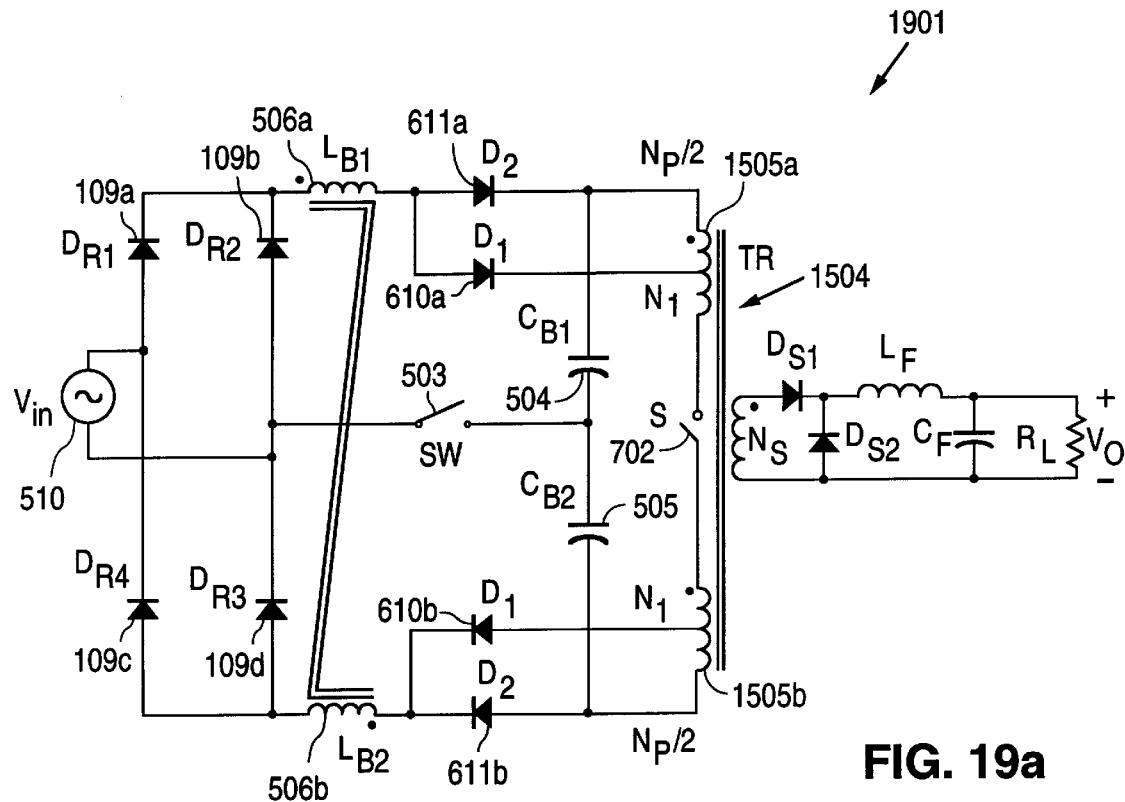
FIGS. 19(a)–(d) show converters 1901–1904, which implement converter 1300 with tapped primary windings; converters 1901 and 1903 are shown including coupled DC-side boost inductors 506a and 506b, and converters 1902 and 1904 are shown including AC-side boost inductor 506.
Figure 19B:
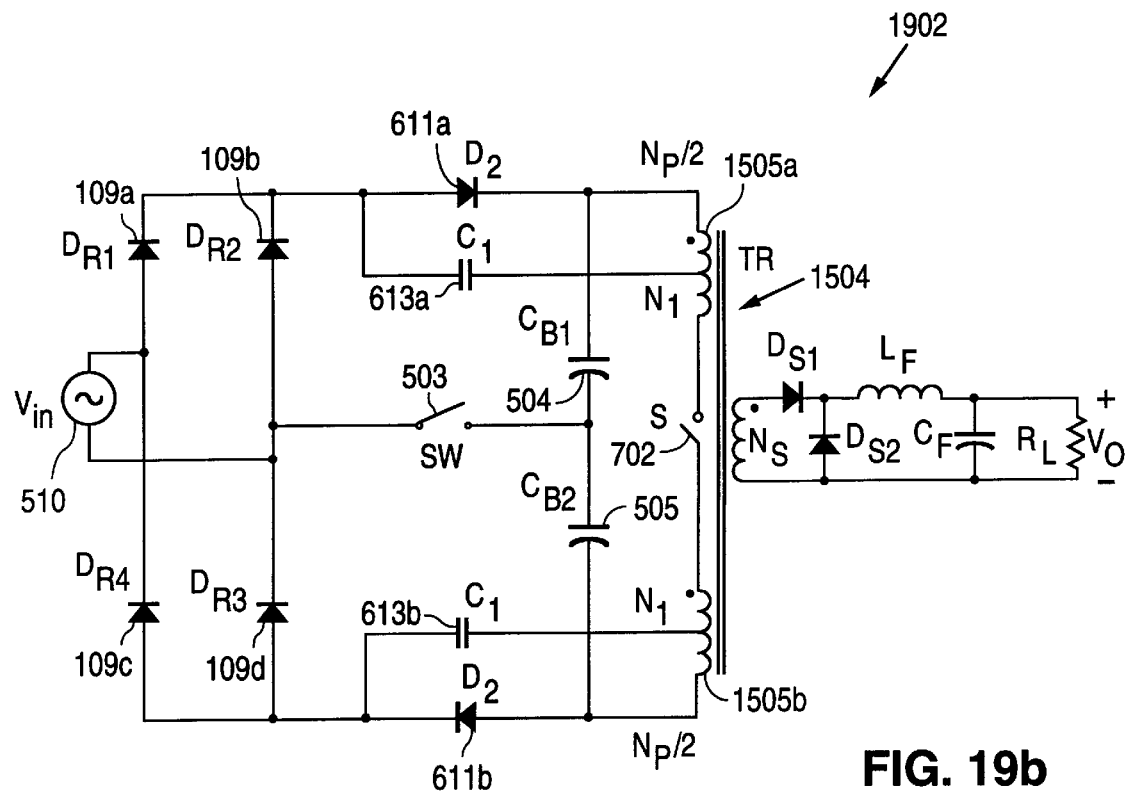
Figure 19C:
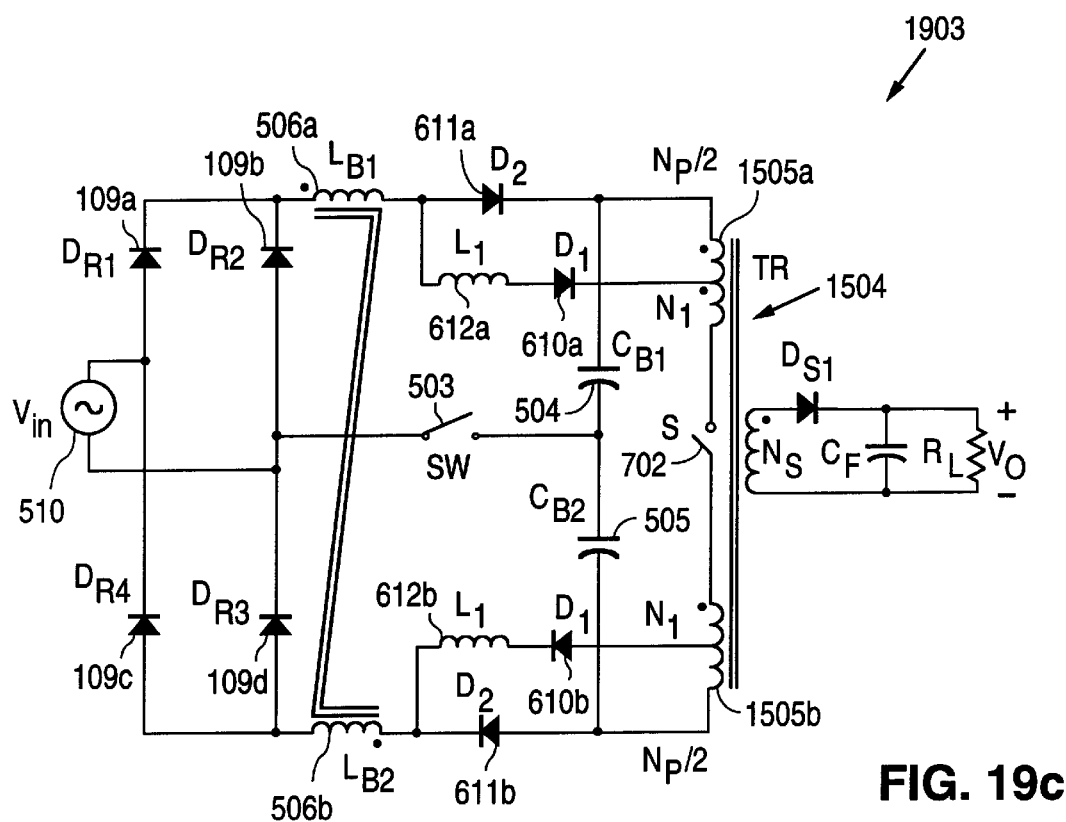
Figure 19D:
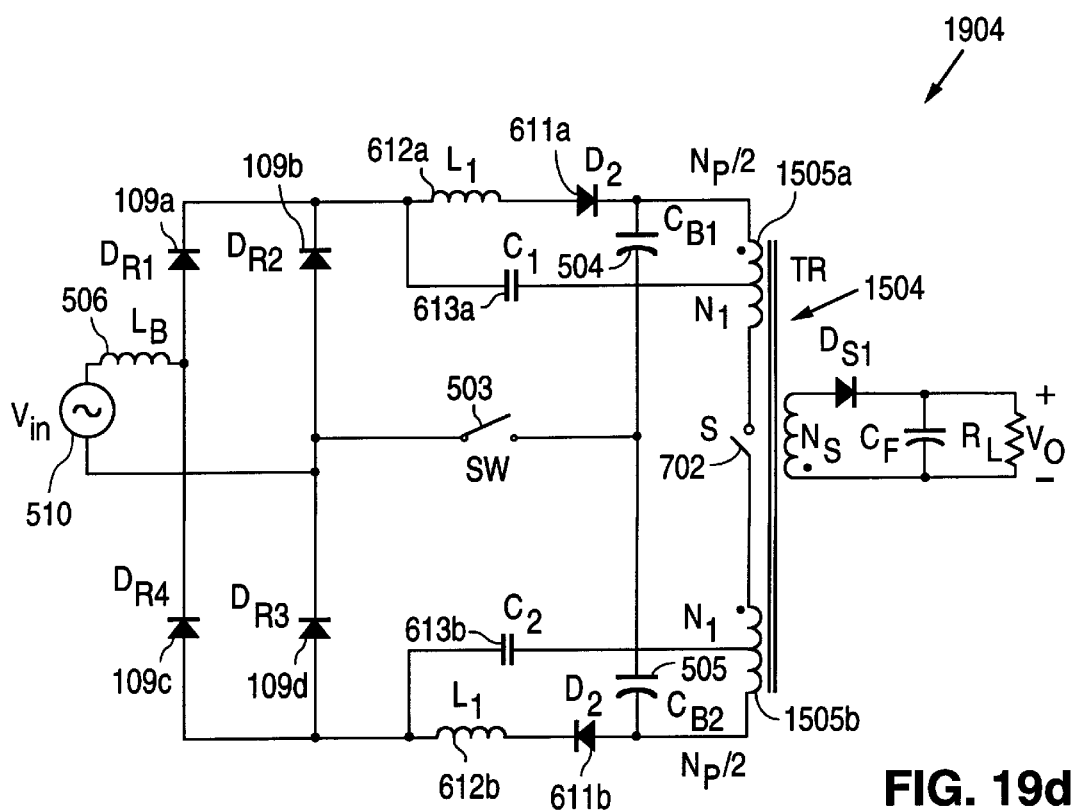

Windings 614 and 615 of dither sources 1307a and 1307b can each be implemented either as additional transformer windings (as shown in FIGS. 14(a)–14(g)) or as portions of the split primary winding of the transformer in DC/DC power stage 1308, by using a tapping technique. For example, FIGS. 18(a) and 18(b) show converters 1801 and 1802, which implement converter 1300 of FIG. 13 by combining DCM dither sources 1401 of FIG. 14(a) and forward DC/DC power stage 1501 of FIG. 15(a). Specifically, in FIG. 18(a), windings 614a, 615a, 614b, and 615b of dither sources 1307a and 1307b are implemented as additional windings coupled to transformer 1504. In FIG. 18(b), windings 614a, 615a, 614b, and 615b of dither sources 1307a and 1307b are implemented as portions of split primary windings 1505a and 1505b, using tapping. Converters 1801 and 1802 each require the same number of pins of transformer 1504. However, since the implementation of transformer 1504 in FIG. 18(b) does not require additional windings, the construction of transformer 1504 in FIG. 18(b) is simpler than the construction of the corresponding transformer in FIG. 18(a).

As mentioned above, the boost inductor or inductors in a S²ICS converter of the present invention can be placed on the AC side of the rectifier bridge (i.e., rectifiers 109a–109d) as a single boost inductor 506, or DC-side boost inductors 506a and 506b can be coupled by winding them on the same magnetic core. FIGS. 19(a)–19(d) show converters 1901–1904, implementing S²ICS converter 1300 of FIG. 13. Converters 1901–1904 combine selected dither sources 1401–1407 shown in FIGS. 14(a)–14(g) (choosing zero turns for winding 615) with forward and flyback DC/DC converter stages 1501 and 1502 from FIG. 15. Specifically, converters 1901 and 1903 are exemplary converters implementing converter 1300 with coupled DC-side boost inductors, combining forward DC/DC converter stage 1501 of FIG. 15(a) with tapped primary winding and dither DCM sources 1401 of FIG. 14(a), and combining flyback DC/DC converter stage 1502 of FIG. 15(b) with tapped primary winding and dither CCM current sources 1403 of FIG. 14(c), respectively. Converters 1902 and 1904 are examples implementing converter 1300 with AC-side boost inductor 506, combining forward DC/DC converter stage 1501 of FIG. 15(a) with tapped primary winding and dither CCM voltage sources 1404 of FIG. 14(d), and combining flyback DC/DC converter stage 1502 of FIG. 15(b) with tapped primary winding and dither CCM voltage/current sources 1405 of FIG. 14(e), respectively. In FIGS. 19(a)–19(d), because the number of turns $N_2$ of windings 615 is selected to be zero, transformer 1504 has only one tapping on each portions 1505a and 1505b of the split primary winding.

Figure 14A:
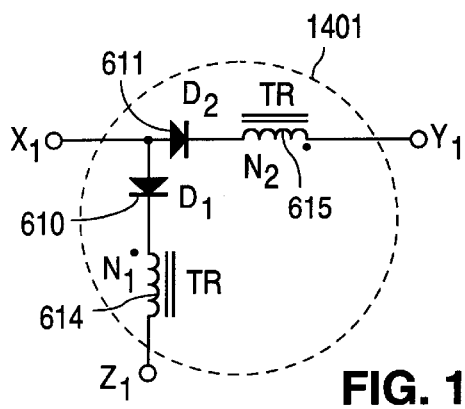
FIGS. 14(a)–14(g) show various dither sources 1401–1407 that can be used to implement dither source 1307a in 3-terminal ICS cell 1301a in converter 1300 of FIG. 13.
Figure 14B:
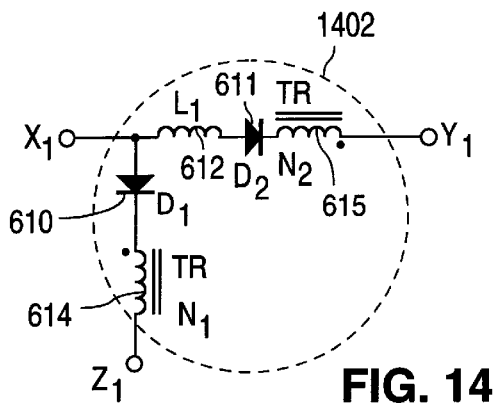
Figure 14C:
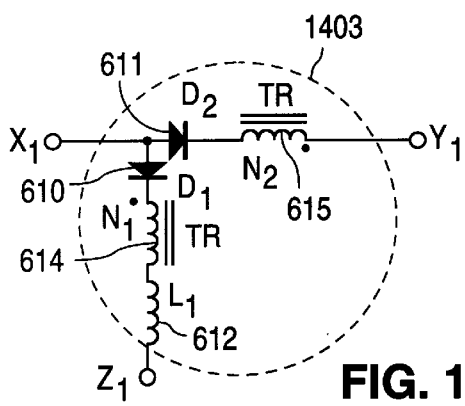
Figure 14D:
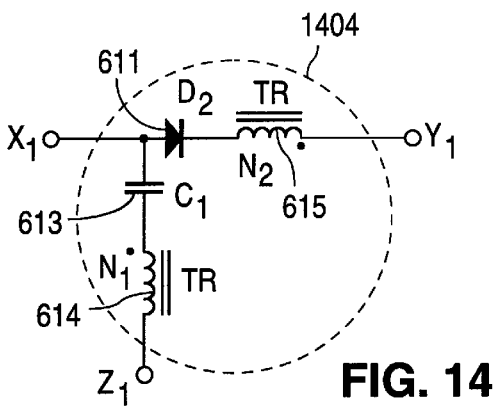
Figure 14E:
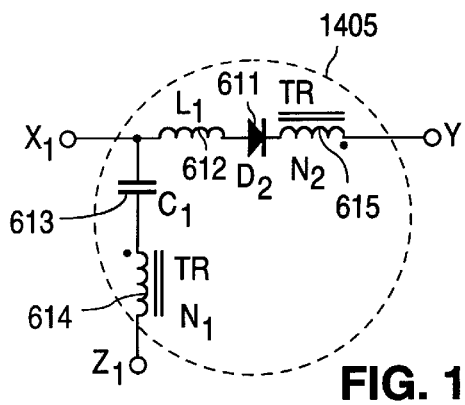
Figure 14F:
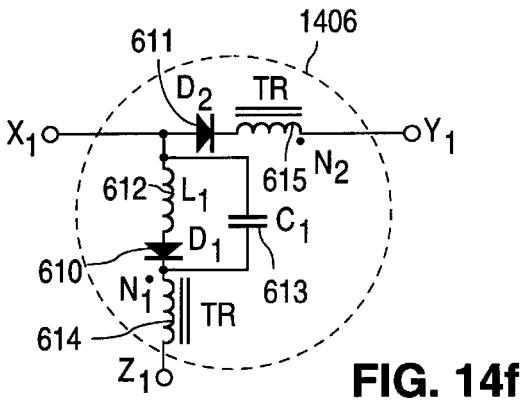
Figure 14G:
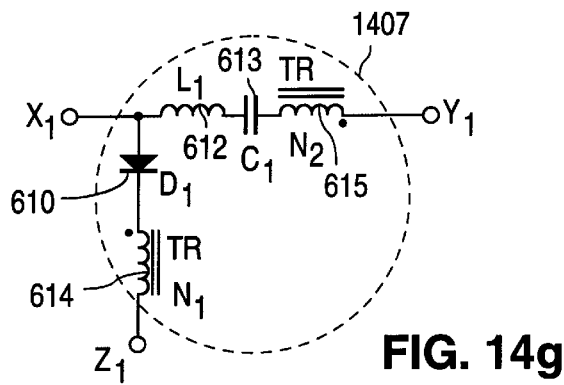
Figure 16A:
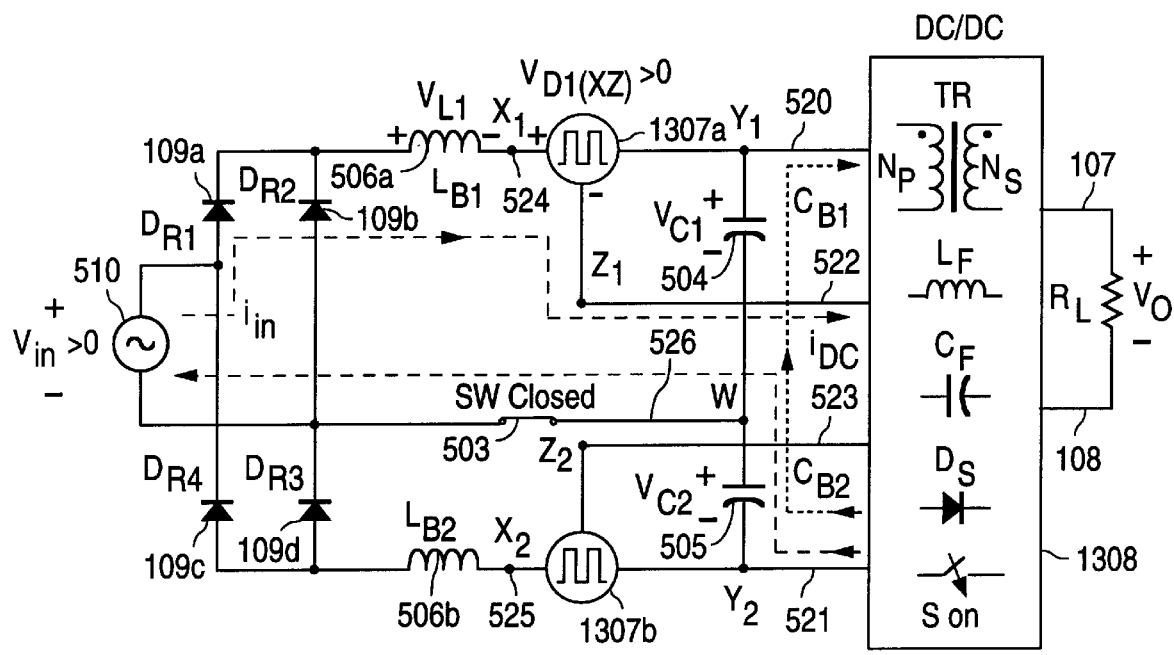
FIGS. 16(a)–16(d) show the operation modes of converter 1300 of FIG. 13 at a low line-range (e.g., connected to the 100/120 V AC power line).
Figure 16B:
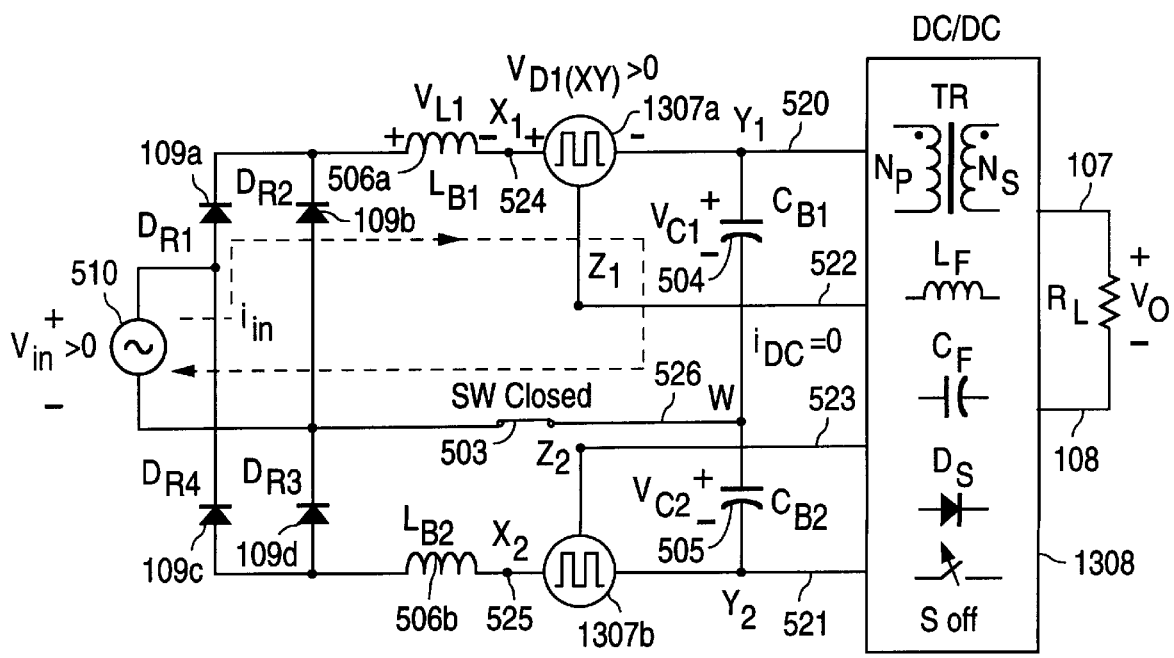
Figure 16C:
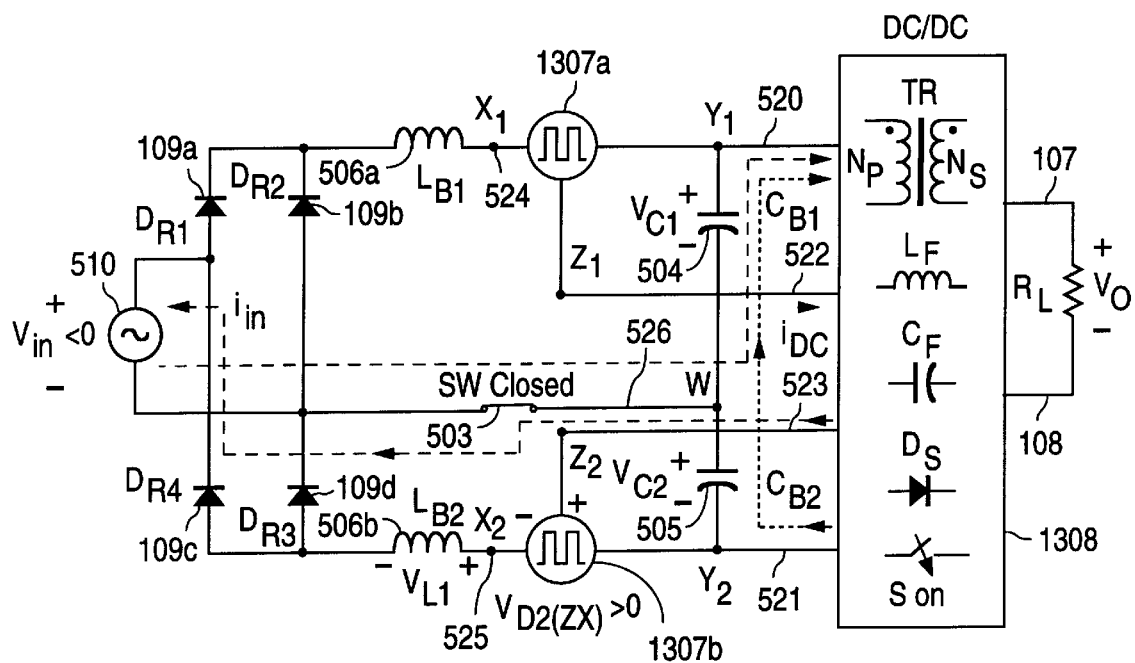
Figure 16D:
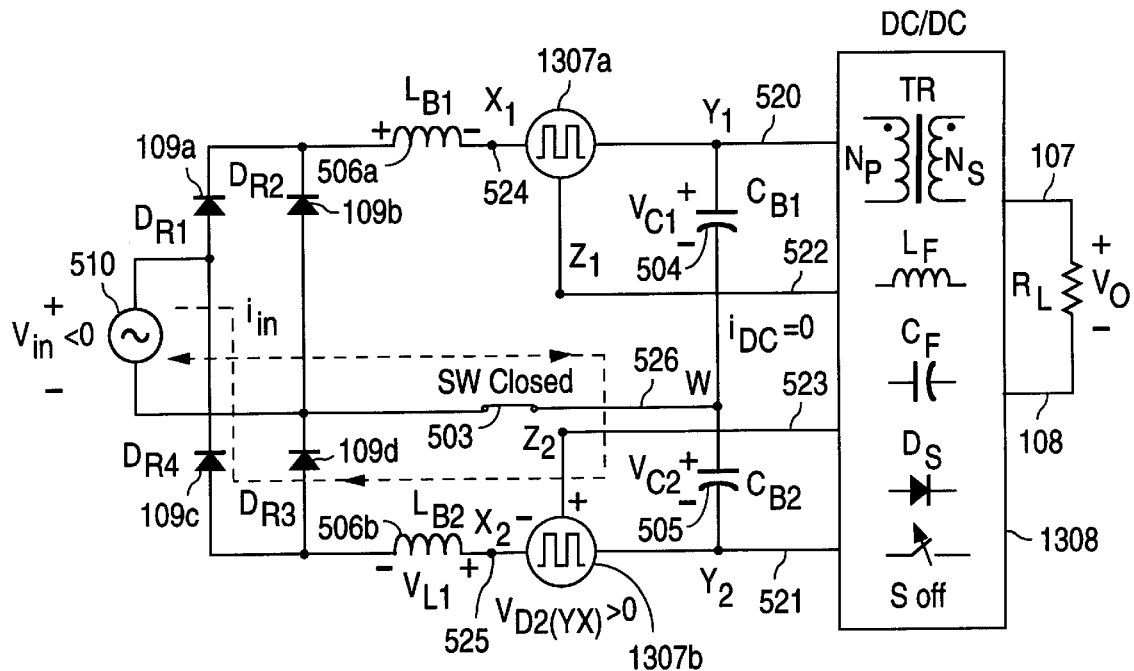
Figure 17A:
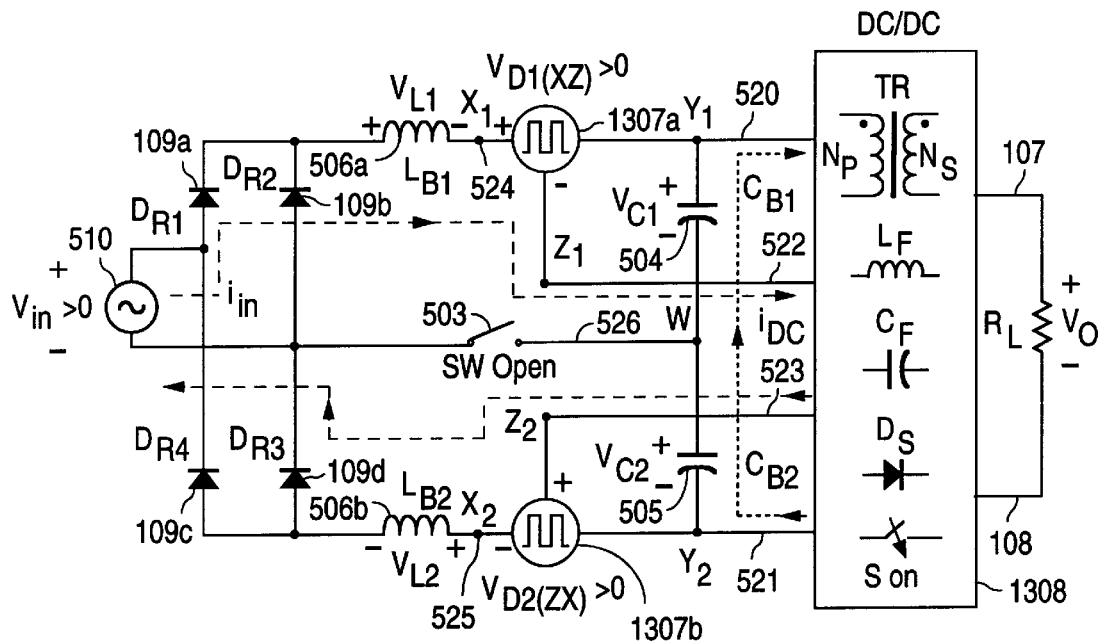
FIGS. 17(a)–17(d) show the operation modes of converter 1300 of FIG. 13 at a high line-range (i.e., connected to the 220/240 V AC power line).
Figure 17B:
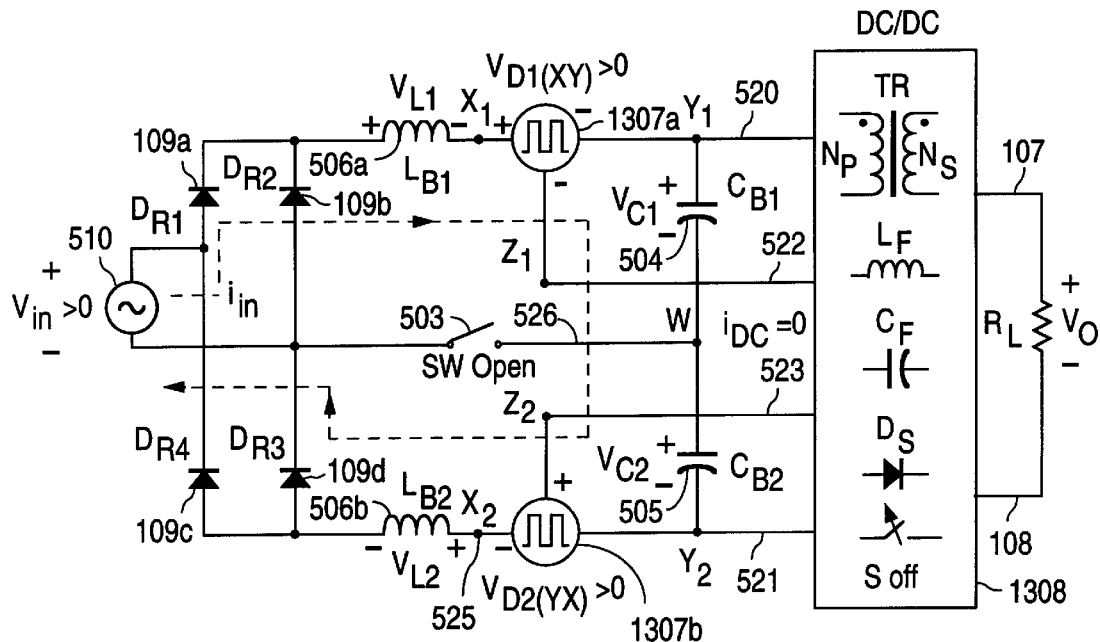
Figure 17C:
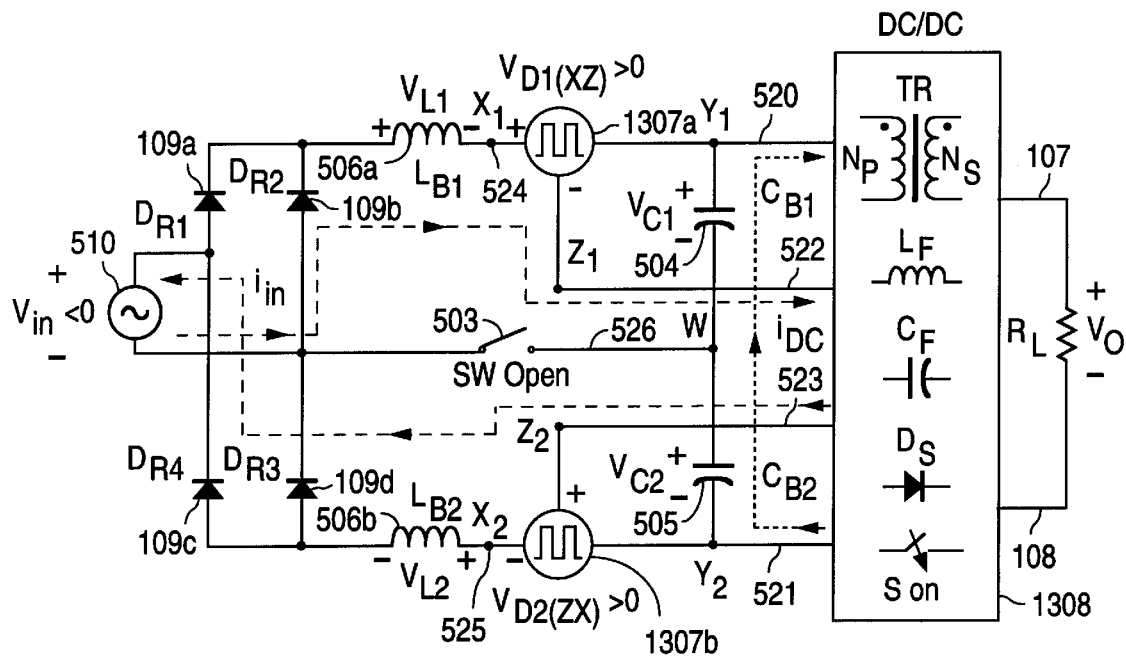
Figure 17D:
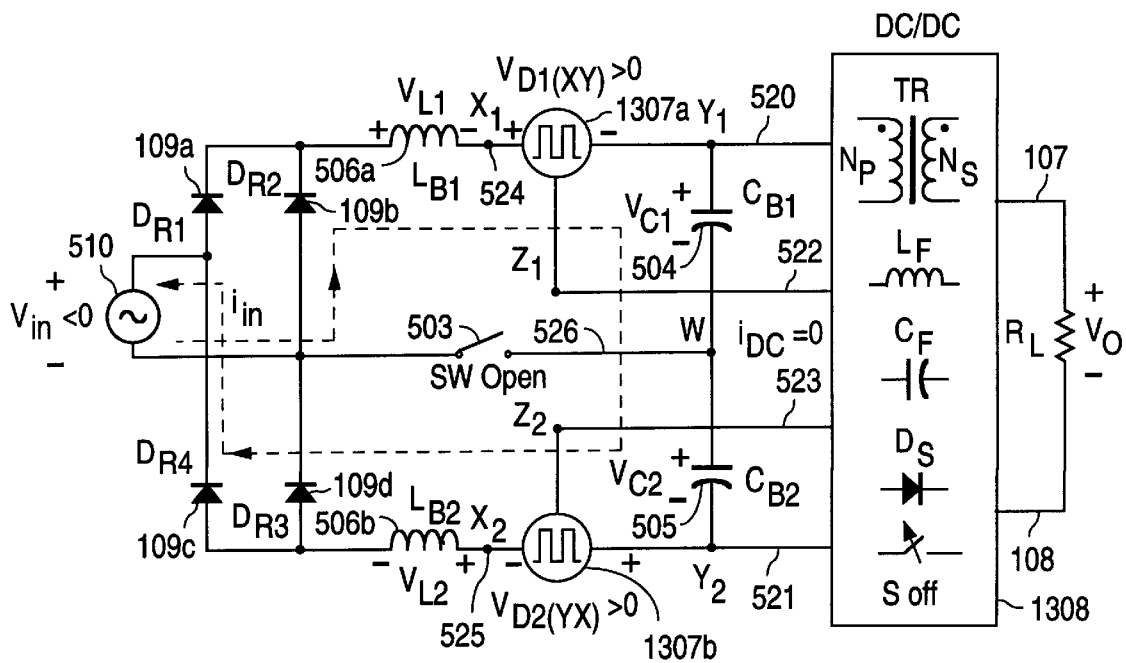
Figure 20:
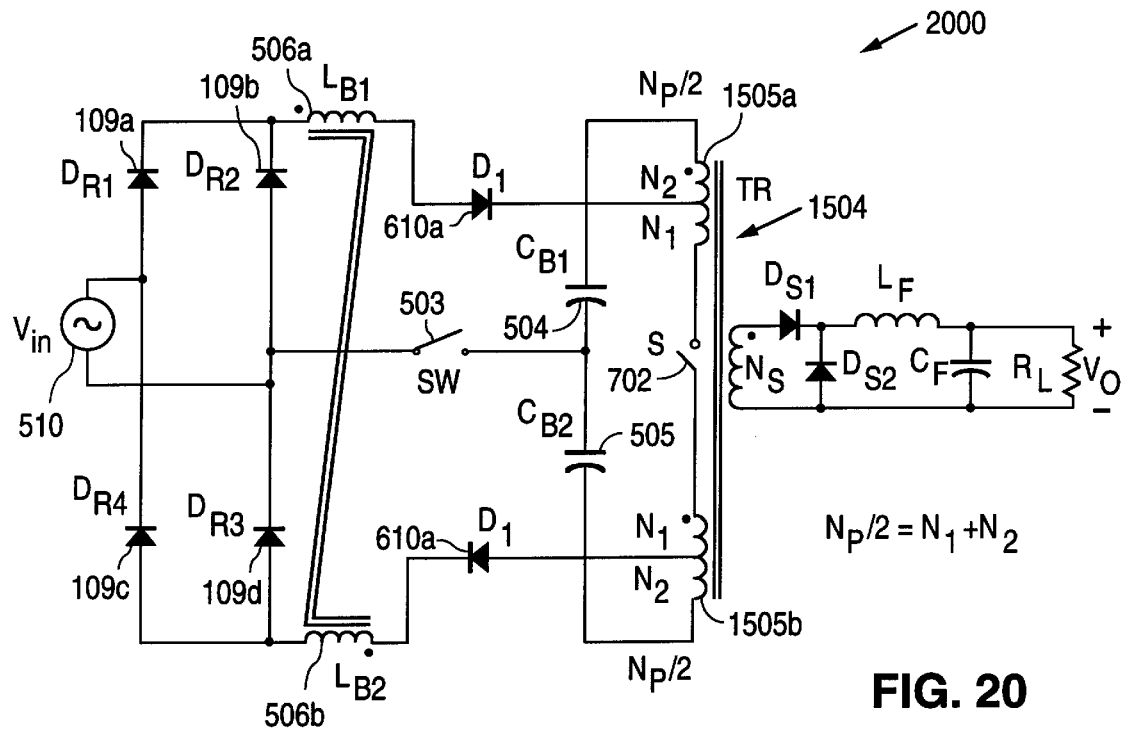
FIG. 20 shows converter 2000, which implements converter 1802 of FIG. 18(b) with a reduced number of components.

FIG. 20 shows converter 2000, implementing converter 1802 of FIG. 18(b) with a reduced number of components. In converter 2000, the two tapping points of each portion 1505a and 1505b of the split primary winding of transformer 1504 are shorted. Consequently, the sum of turns $N_1$ and $N_2$ of windings 614 and 615 in dither DCM source 1401 of FIG. 14(a) is equal to half the number of turns $N_1$ of the primary winding of transformer 1504 (i.e., $N_1+N_2=N_p/2$).

Generally, S²ICS converters of the present invention with 2-terminal and 3-terminal ICS cells provide comparable performance. Differences between the S²ICS converters with 2-terminal and 3-terminal ICS cells relate to transformer design and control implementation. A 2-terminal ICS cell in converter 500 of FIG. 5 requires at least one additional transformer winding (i.e., winding 614 in FIGS. 6(a)–6(g)) in each of dither sources 507a and 507b, compared to a 3-terminal ICS cell in converter 1300 of FIG. 13 with a dither source implemented by tapping the split primary winding (see, for example, FIG. 18(b)). However, a tapped transformer with a non-zero number of turns $N_1$ in dither sources 1307a and 1307b of converter 1300 in FIG. 13 requires one additional pin compared to the transformer in converter 500 of FIG. 5. For example, converters 1201–1204 with 2-terminal ICS cells in FIG. 12 each have a transformer with five pins on the primary side, while the corresponding converters 1901–1904 with 3-terminal ICS cells in FIG. 19 each have a transformer with six pins on the primary side. Consequently, the transformer in converter 500 of FIG. 5 may be larger than the corresponding transformer in converter 1300 of FIG. 13, whereas the transformer in converter 1300 of FIG. 13 may require a custom made bobbin. Further, in converter 1300 of FIG. 13 with 3-terminal ICS cells, the switch in DC/DC power stage 1308 (e.g., switch 702 in FIG. 15) and storage capacitor 505 do not have the same reference voltage, which may affect the switch driver circuit and the control feedback circuit by requiring additional signal isolation.

Figure 21A:
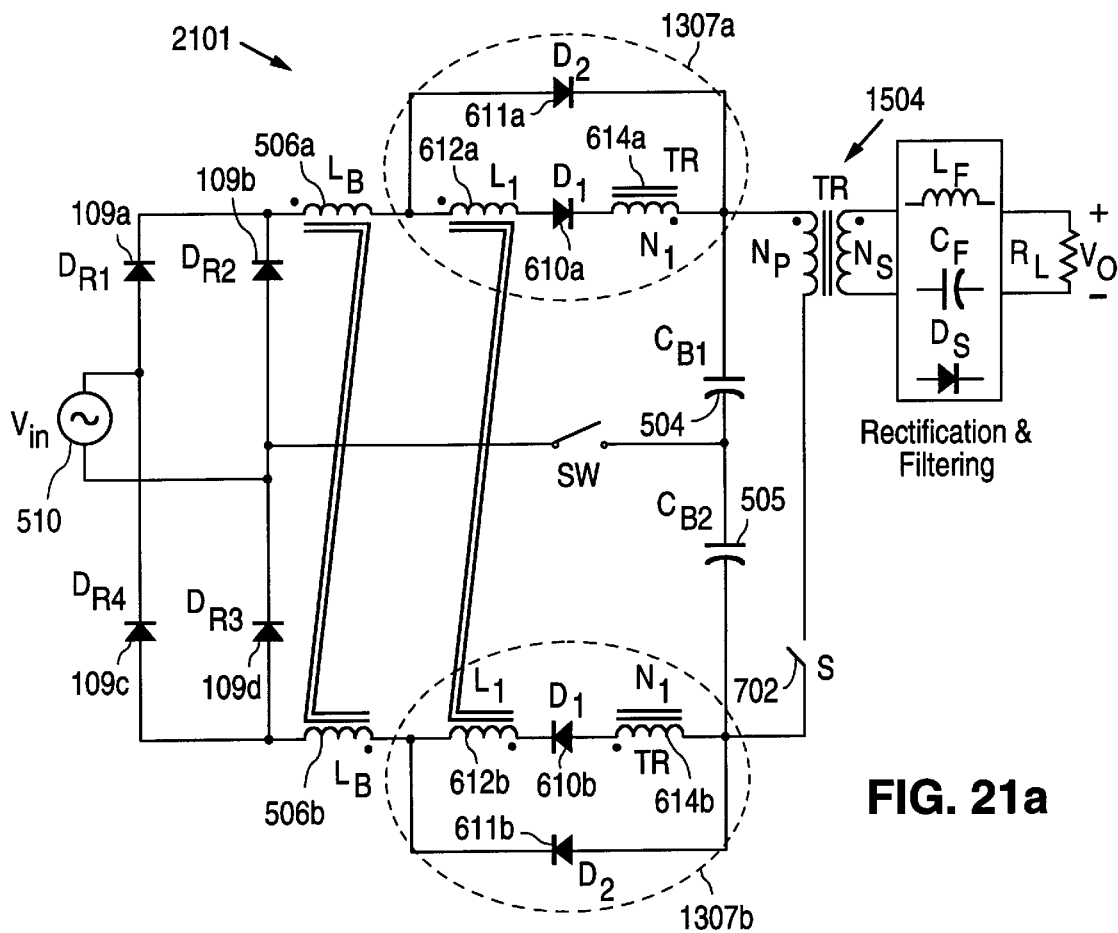
FIGS. 21(a) and 21(b) show converters 2101 and 2102, which implement converters 500 and 1300, using current-type dither sources with coupled inductors 612a and 612b.
Figure 21B:
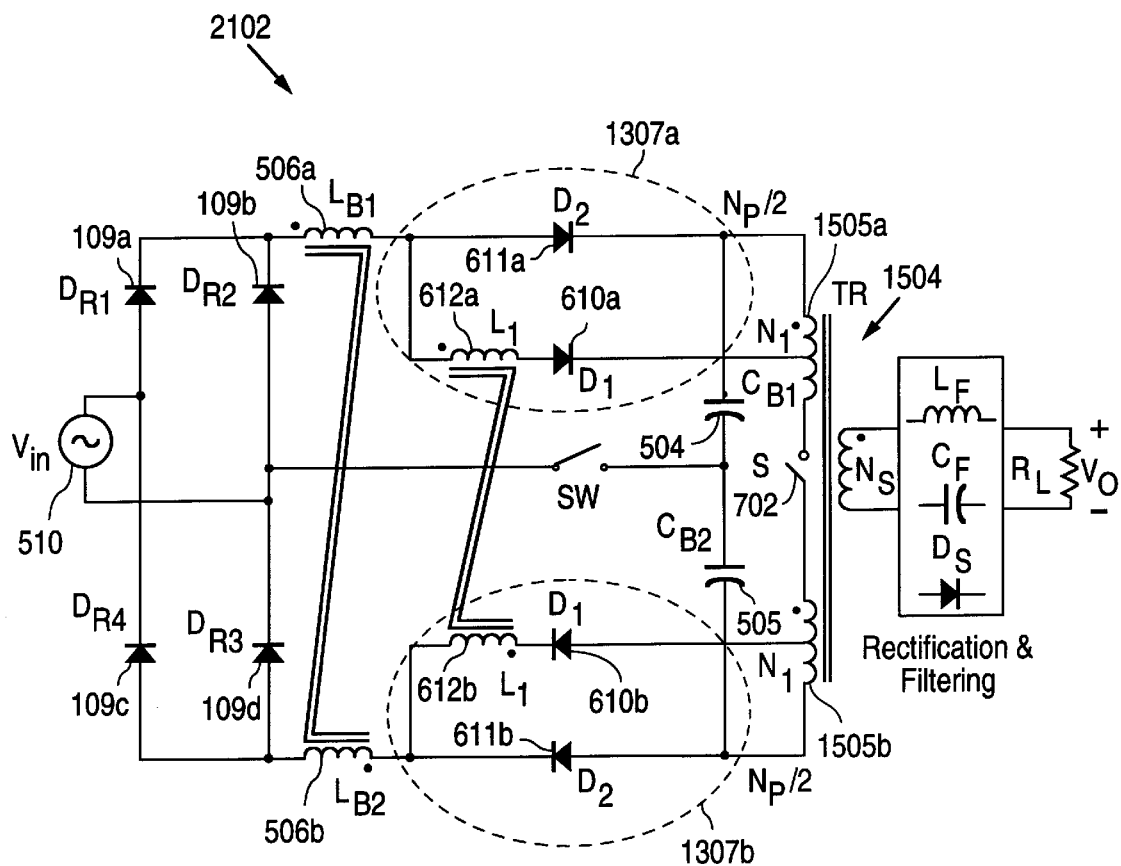

In all implementations of converter 500 in FIG. 5 and converter 1300 in FIG. 13 that use current-type dither sources (i.e., dither sources with inductor 612 in FIGS. 6 and 14), inductors 612a and 612b can be wound on the same core. For example, FIGS. 21(a) and 21(b) show converters 2101 and 2102, which implement converter 500 of FIG. 5 and converter 1300 of FIG. 13, respectively, having dither current sources 507a and 507b, and 1307a and 1307b. Each of dither current sources 507a and 507b is an implementation of dither CCM current source 603 of FIG. 6(c), with number of turns $N_2$ of winding 615 set to zero. Similarly, each of dither current sources 1307a and 1307b is an implementation of dither CCM current source 1403 of FIG. 14(c), implementing winding 614 by tapping the split primary winding and setting number of turns $N_2$ of winding 615 to zero. In each of converters 2101 and 2102, dither-current-source inductors 612a and 612b are implemented as coupled inductors.

Figure 22:
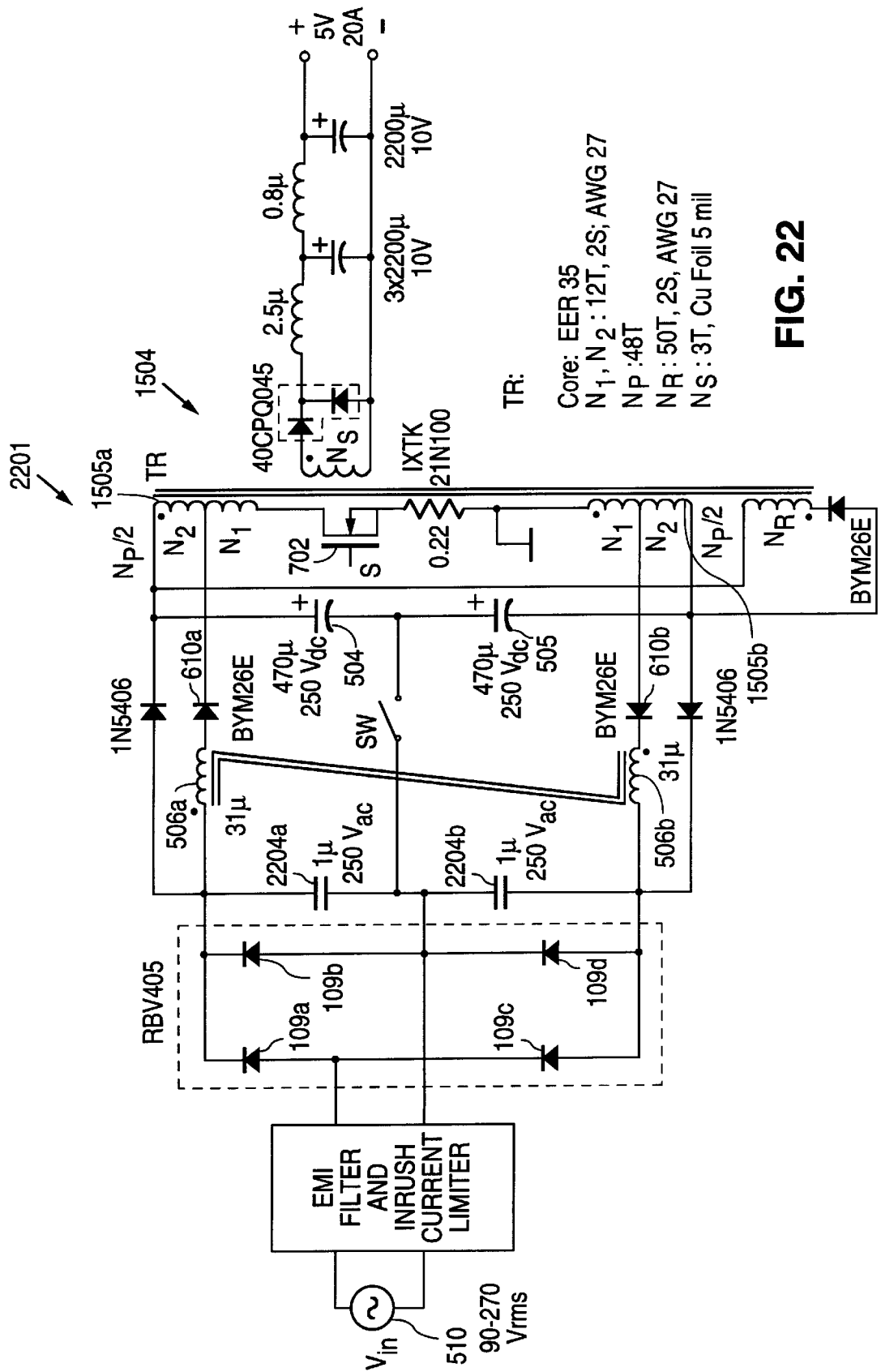
FIG. 22 is a circuit diagram of the 100-W (5 V/20 A) experimental converter.

The performance of the proposed S²ICS approach of the present invention was verified experimentally using converter 2200 of FIG. 22. Converter 2200 is a 100-W (5 V/20 A) converter for the universal-line range (i.e., 90–264 V AC). The components used to build converter 2200 are noted on the circuit schematic in FIG. 22. A low-cost integrated controller (UC3842) was used to control converter 2200. Throughout the entire line-voltage and load ranges, a constant switching frequency of 100 kHz was applied. Table I summarizes the measured performance of converter 2200 at full load and at different line voltages. As shown in Table I, the power factor (PF) in the entire line range was between 0.88 and 0.9, whereas the total harmonic distortion (THD) was less than 50%. In addition, the measured individual line-current harmonics in converter 2200 were well below the IEC1000-3-2 limits (more than 30% margin) for both the low line-range and high line-range. Also, as shown in Table I, at the full load, the maximum storage capacitor voltage $V_C=V_{C1}+V_{C2}$, i.e., the total voltage across capacitors 504 and 505, was measured to be 368 V, occurring at $V_{in}$=264 V AC. The conversion efficiency at the full load was in the 77%–79% range.

TABLE I

Measured Performance (PF - Power Factor; THD - Total Harmonic Distortion; $V_C = V_{C1} + V_{C2}$ - bulk-capacitor voltage; and η - conversion efficiency) at full load ($V_o$ = 5 V, $I_o$ = 20 A) and at different line voltages $V_{in}$.

| $V_{in}$ [$V_{rms}$] | PF | THD [%] | $V_C$ [V] | η [%] |
|---|---|---|---|---|
| 90 | 0.900 | 46.4 | 244 | 77.3 |
| 100 | 0.899 | 47.2 | 273 | 77.4 |
| 115 | 0.896 | 48.3 | 316 | 77.3 |
| 132 | 0.893 | 49.3 | 364 | 76.9 |
| 180 | 0.897 | 48.0 | 250 | 79.2 |
| 230 | 0.891 | 48.9 | 320 | 78.4 |
| 264 | 0.885 | 49.6 | 368 | 77.8 |

The above detailed description is provided to illustrate specific embodiments of the present invention and is not intended to be limiting. Numerous modifications and variations within the scope of the present invention are possible. The present invention is set forth in the following claims.

We claim:

1. A single-stage input current shaping (S²ICS) converter coupled to receive a line voltage, comprising:
    a front-end stage receiving said line voltage, including:
        (a) a full-bridge rectifier;
        (b) one or more boost inductors;
        (c) first and second dither sources each coupled in series with one of said boost inductors; and
        (d) first and second storage capacitors, coupled to said full-bridge rectifier in a voltage-doubler configuration and coupled respectively to said first and second dither sources, such that each of said first and second capacitors is charged by one of said boost inductors for storing energy for output; and
    a DC/DC power converter stage, coupled to both said storage capacitor and said dither source, to transfer said energy stored in said storage capacitor to an output load.

2. An S²ICS converter as in claim 1, wherein said DC/DC converter stage comprises a full-bridge converter.

3. An S²ICS converter as in claim 1, wherein said one of said inductors is coupled between said line voltage and said full-bridge rectifier.

4. An S²ICS converter as in claim 1, wherein said DC/DC converter stage is controlled by a switch, such that said DC/DC converter draws a current from said storage capacitor when said switch is closed.

5. An S²ICS converter as in claim 4, wherein said boost inductor stores energy in its magnetic field while said switch is closed.

6. An S²ICS converter as in claim 4, wherein said one or more boost inductors charge said first and second storage capacitors when said switch is open.

7. An S²ICS converter as in claim 1, wherein each of said first and second dither sources include a first path for charging one of said boost inductors and a second path for discharging said one of said boost inductors, said first and second paths each including a series connection of a transformer winding and at least one of the following components: a diode, an inductor, and a capacitor; and wherein said DC/DC power converter stage includes a transformer inductively coupled to said transformer windings of said first path and said second path of said dither source.

8. An S²ICS converter as in claim 7, wherein said first path and said second path of said dither source are connected in parallel, such that said dither source includes a first terminal coupled to said one of said boost inductors and a second terminal coupled to both one of said first and second storage capacitors and said DC/DC converter stage, said transformer winding of said first path of said dither source being coupled to generate a voltage in opposition to the voltage across said one of said first and second capacitors, when said switch of said DC/DC converter is closed, and said transformer winding of said second path of said dither source is coupled to generate a voltage of the same direction as the voltage across said one of said first and second capacitors when said switch of said DC/DC converter is open.

9. An S²ICS converter as in claim 7, wherein said first path and said second path of said dither source are coupled at one terminal to said one of said boost inductors, such that said dither source has a first terminal being coupled to said one of said boost inductors a second terminal, being the second terminal of said second path of said dither source, coupled to both one of said first and second storage capacitors and said DC/DC converter stage, and a third terminal, being the second terminal of said first path of said dither source, coupled to any pulsating node of said DC/DC converter stage, said transformer winding of said first path of said dither source being coupled to generate a voltage in opposition to said rectified line voltage, when said switch of said DC/DC converter is closed, and said transformer winding of said second path of said dither source being coupled to generate a voltage in opposition to said rectified line voltage when said switch of said DC/DC converter is open.

10. An $S^2ICS$ converter as in claim 9, wherein said transformer windings of said first path and said second path of said dither source being provided by tapping a primary winding of said transformer of said DC/DC converter stage.

11. An $S^2ICS$ converter as in claim 1, wherein said DC/DC converter stage comprises a flyback converter.

12. An $S^2ICS$ converter as in claim 1, wherein said DC/DC converter stage comprises a half-bridge converter.

13. An $S^2ICS$ converter as in claim 1, further comprising a range-select switch coupled between said full-bridge rectifier and the common terminal of said first and second storage capacitors for activating a voltage-doubling operation when said range-select switch is closed.

14. An $S^2ICS$ converter as in claim 13, wherein said first and second boost inductors are inductively coupled.

15. An $S^2ICS$ converter as in claim 13, wherein an inductor of said first dither source and an inductor of said second dither source are inductively coupled.

16. An $S^2ICS$ converter as in claim 1, wherein said DC/DC converter stage comprises a forward converter.

* * * * *